(12) United States Patent
Omura et al.

(10) Patent No.: US 11,759,396 B2
(45) Date of Patent: Sep. 19, 2023

(54) MEDICINE FEEDER

(71) Applicant: TOSHO, INC., Tokyo (JP)

(72) Inventors: Yoshihito Omura, Tokyo (JP); Syunji Ohgaya, Tokyo (JP)

(73) Assignee: TOSHO, INC., Tokyo (JP)

( * ) Notice: Subject to any disclaimer, the term of this patent is extended or adjusted under 35 U.S.C. 154(b) by 0 days.

(21) Appl. No.: 17/795,695

(22) PCT Filed: Jan. 28, 2021

(86) PCT No.: PCT/JP2021/003052
§ 371 (c)(1),
(2) Date: Jul. 27, 2022

(87) PCT Pub. No.: WO2021/153674
PCT Pub. Date: Aug. 5, 2021

(65) Prior Publication Data
US 2023/0056980 A1    Feb. 23, 2023

(30) Foreign Application Priority Data

Jan. 29, 2020 (JP) .................................. 2020-012086
Jan. 29, 2020 (JP) .................................. 2020-012127
(Continued)

(51) Int. Cl.
*A61J 3/00*    (2006.01)
*A61J 7/00*    (2006.01)
*G07F 17/00*   (2006.01)

(52) U.S. Cl.
CPC ............. *A61J 3/00* (2013.01); *A61J 7/0076* (2013.01); *G07F 17/0092* (2013.01)

(58) Field of Classification Search
CPC .................................................. A61J 7/0076
See application file for complete search history.

(56) References Cited

U.S. PATENT DOCUMENTS 8,839,988 B2 *   9/2014  Yuyama ................. B65B 57/20
                                              221/277
10,192,322 B2    1/2019  Koike et al.
                         (Continued)

FOREIGN PATENT DOCUMENTS

JP    2018-108277    7/2018
WO    2015/119055    8/2015
WO    2018/128133    7/2018

OTHER PUBLICATIONS

International Search Report, dated Mar. 30, 2021, 2 pages.

*Primary Examiner* — Gene O Crawford
*Assistant Examiner* — Ayodeji T Ojofeitimi
(74) *Attorney, Agent, or Firm* — Rankin, Hill & Clark LLP

(57) ABSTRACT

A medicine feeder includes: an outer rotary body on the outer side to be rotated about a vertical line; an inner inclined rotary body on the inner side to be rotated about an inclined line; and a sorting mechanism and a regulating mechanism operable to align solid medicine pieces carried from the top of the inner inclined rotary body onto an annular upper end surface of the outer rotary body through rotation of the inner inclined rotary body. An upper surface inclined portion of the inner inclined rotary body includes delivery portions sloping downward toward the outer side even at an elevated position and push-up portions not sloping downward toward the outer side, the delivery portions and the push-up portions being formed alternately in the circumferential direction. The push-up portions include projecting portions. The projecting portions are extended to the inner peripheral side of the delivery portions.

22 Claims, 16 Drawing Sheets

(30) Foreign Application Priority Data

| | | |
|---|---|---|
| Jan. 29, 2020 | (JP) | 2020-012192 |
| Jan. 29, 2020 | (JP) | 2020-012231 |
| Jan. 29, 2020 | (JP) | 2020-012315 |
| Jan. 29, 2020 | (JP) | 2020-012424 |
| Jul. 21, 2020 | (JP) | 2020-124675 |

(56) References Cited

U.S. PATENT DOCUMENTS

| | | | |
|---|---|---|---|
| 10,828,238 B2 | 11/2020 | Omura | |
| 2013/0284755 A1* | 10/2013 | Yuyama | B65G 47/1464 221/277 |
| 2014/0246451 A1* | 9/2014 | Yuyama | G07F 11/44 221/13 |
| 2015/0129603 A1* | 5/2015 | Koike | A61J 7/0084 221/13 |
| 2018/0161247 A1* | 6/2018 | Koike | A61J 7/0076 |

\* cited by examiner

MEDICINE FEEDER

TECHNICAL FIELD

The present invention relates to a medicine feeder operable to automatically feed solid granular medicine pieces such as tablets and ampules in order to automate dispensing of medicine performed in hospitals, pharmacies, etc. More particularly, the present invention relates to a medicine feeder configured to house a large number of medicine pieces of the same shape in a random manner and to align the medicine pieces using rotary bodies to consecutively feed and sequentially discharge the medicine pieces one by one.

BACKGROUND ART

Patent Document 1 (Japanese Patent Application Publication No. 2018-108277; U.S. Pat. No. 10,828,238; WO 2018/128133), for example, describes a medicine feeder according to the related art, including an outer rotary body, an inner inclined rotary body, a regulating mechanism, and a sorting mechanism. The outer rotary body has therein an internal space that has an opening portion opening upward and an annular upper end surface that surrounds the opening portion, and is rotatable about a virtual vertical line that extends in the up-down direction within the internal space. The inner inclined rotary body is disposed in the internal space of the outer rotary body capable of rotating about a virtual inclined line, which is inclined with respect to the vertical line, with a plurality of solid medicine pieces being placed on an upper surface portion of the inner inclined rotary body. The inner inclined rotary body moves the plurality of medicine pieces onto the annular upper end surface of the outer rotary body when the inner inclined rotary body is rotated. The regulating mechanism is operable to align the plurality of medicine pieces, which have been moved onto the annular upper end surface of the outer rotary body, along the rotational direction of the annular upper end surface when the outer rotary body is rotated.

A part of the configuration of the medicine feeder according to the related art that serves to understand the present invention will be specifically described with reference to FIGS. 9 to 13. FIGS. 9A and 9B are a plan view and a vertical sectional view, respectively, illustrating the configuration of a main portion of a medicine feeder 10 according to the related art. FIG. 10A is a plan view of the medicine feeder illustrated in FIG. 9 from which a link mechanism 73 and an upper layer portion of a top plate 11A of a housing 11 disposed at the uppermost portion of the medicine feeder have been removed. FIG. 10B is a plan view of the medicine feeder from which the top plate 11A and objects 60, 71, and 72 mounted thereon illustrated in FIG. 9B also have been removed. FIG. 11A includes a front view, a right side view, and a right side view of a sorting mechanism 60. FIG. 11B is an exploded sectional view of an essential portion of the medicine feeder according to the related art, illustrating a vertical section of the top plate 11A, etc., an outer rotary body 20, and an inner inclined rotary body 30 and the appearance of a rotary drive mechanism 50 and rotation transmission members 42 and 43. It is to be noted that some of the reference numerals used in FIGS. 9 to 13 and the names of the members have been changed from the reference numerals and the names of the members used in Patent Document 1 (Japanese Patent Application Publication No. 2018-108277; U.S. patent Ser. No. 10/828,238; WO 2018/128133), in order to facilitate understanding. In the following description, the structures described in detail in Patent Document 1 will not be described, and only portions that are relevant to the present invention will be described.

As illustrated in FIG. 9B, the medicine feeder 10 includes a housing 11 that has a top plate 11A located at the uppermost portion and having a through hole 11B formed in a circular shape at the center portion. The outer rotary body 20 is housed inside the housing 11, the upper end portion of the outer rotary body 20 being rotatably fitted in the through hole 11B. A body 21 of the outer rotary body 20 has therein an internal space 22 that has an opening portion 22A opening upward and an annular upper end surface 23 that surrounds the opening portion 22A. The outer rotary body 20 is supported in the housing 11 to be rotatable about a virtual vertical line CL1 that extends in the up-down direction within the internal space 22.

The inner inclined rotary body 30 is disposed in the internal space 22 of the outer rotary body 20 capable of rotating about a virtual inclined line CL2, which is inclined with respect to the vertical line CL1, with a plurality of solid medicine pieces being placed on an upper surface portion of the inner inclined rotary body 30. The inner inclined rotary body 30 moves the plurality of medicine pieces onto the annular upper end surface 23 of the outer rotary body 20 when the inner inclined rotary body 30 is rotated. The medicine feeder includes a support mechanism 40 configured to rotatably support both the inner inclined rotary body 30 and the outer rotary body 20 on the outer side thereof, a rotary drive mechanism 50 operable to drive rotation of the inner inclined rotary body 30 and the outer rotary body 20, and a sorting mechanism 60 and a regulating mechanism 70 provided on the upper side of the top plate 11A of the housing 11.

The support mechanism 40 keeps the outer rotary body 20 rotatable about the plumb line CL1, and keeps the inner inclined rotary body 30 rotatable about the inclined line CL2 which is tilted from the plumb line. A rotary container (20, 30) of the medicine feeder of a double rotating type is constituted by the inner inclined rotary body 30 partitioning the internal space 22 of the outer rotary body 20 with a gap. In the medicine feeder, the medicine pieces are carried from the top of an inclined portion 33 of the inner inclined rotary body 30 onto the annular upper end surface 23 of the outer rotary body 20 by lifting the medicine pieces through rotation of the inner inclined rotary body 30 and sorting the medicine pieces using the sorting mechanism 60. In the medicine feeder, in addition, the medicine pieces on the annular upper end surface 23 are carried to a discharge port 14 while aligning the medicine pieces through horizontal transfer of the medicine pieces due to rotation of the outer rotary body 20 and the alignment function of the regulating mechanism 70.

Further, the upper surface of the annular inclined portion 33 which is located at the peripheral edge of the inner inclined rotary body 30 has been processed into a gentle sawtooth wave shape to serve to scoop up the medicine pieces (see FIGS. 9A and 10). The inner inclined rotary body 30 is in a so-called outward-downward sloping shape in which the inner inclined rotary body 30 slopes downward toward the outer side, that is, as the inner inclined rotary body 30 extends away from the center (see FIGS. 9B and 11B). This outward-downward slope is maintained at any position of the inclined portion 33, in particular at the most elevated position at which the outward-downward slope is most gentle and which is located above the annular upper end surface 23 of the outer rotary body 20, with the inner inclined rotary body 30 being installed with an inclination in the outer rotary body 20, and thus serves to smoothly feed the medicine pieces that have been scooped up to the annular upper end surface 23 of the outer rotary body 20 through rolling due to the inclined portion 33.

The support mechanism 40 (see FIGS. 9B and 11B) is composed of a plurality of members 41 to 43 distributed at various locations. The members 41 to 43 include several passive members 41 mainly composed of radial bearings etc., for example, and rotation transmission members 42 and 43 composed of a ring-shaped body or an annular body such as an O-ring made of hard rubber, for example. The rotary drive mechanism 50 (see FIGS. 9B and 11B) includes a rotary drive member 51 disposed under the rotary container (20+30) and a rotary drive motor 54 operable to axially rotate the rotary drive member 51. The rotation transmission members 42 and 43 of the support mechanism 40 also constitute a part of the rotary drive mechanism 50.

The rotary drive mechanism 50 rotates the rotary drive member 51 using the rotary drive motor 54 to rotate the outer rotary body 20 at relatively high speed and to rotate the inner inclined rotary body 30 at relatively low speed.

The sorting mechanism 60 (see FIGS. 9 to 11) is mainly constituted of an elongated rod member configured to extend from a base end portion 61 as a swing fulcrum to a distal end portion 62 as a swing end. The base end portion 61 is supported by a support portion 63 above the top plate 11A and the outer rotary body 20 so that the distal end portion 62 is swingable up and down about the base end portion 61. Most of the medicine pieces that have been carried on the inclined portion 33 of the inner inclined rotary body 30 to the annular upper end surface 23 of the outer rotary body 20 from the inclined portion 33 without slipping off therefrom abut against the distal end portion 62 of the sorting mechanism 60 to be returned to a recessed portion 32 of the inner inclined rotary body 30.

The regulating mechanism 70 (see FIGS. 9 and 10A) includes a first regulating member 71 installed ahead of the sorting mechanism 60 in the rotational direction of the annular upper end surface 23 of the outer rotary body 20, a second regulating member 72 installed further ahead of the first regulating member 71, a link mechanism 73 coupled to the first regulating member 71 and the second regulating member 72, and a sample placement site 74 in which a sample medicine piece may be accommodated.

A swing center portion of both the first regulating member 71 and the second regulating member 72 is located on the top plate 11A side, and a swing end portion of the two regulating members is located over the annular upper end surface 23 of the outer rotary body 20. Thus, the regulating mechanism 70 reduces the width of a medicine transfer path on the annular upper end surface 23 from the outer peripheral side.

The discharge port 14 which vertically penetrates the top plate 11A is formed further ahead of the regulating mechanism 70. The top plate 11A is provided with a discharge guide 13 to feed the medicine pieces on the annular upper end surface 23 of the outer rotary body 20 to the discharge port 14 through rotation of the outer rotary body 20. The medicine pieces that have been carried on the annular upper end surface 23 of the outer rotary body 20 obliquely abut against a side wall of the discharge guide 13, and are obliquely moved along the side wall to reach the discharge port 14.

Further, a transfer surface guide 12 is formed at the distal end portion of the discharge guide 13 to extend downward and forward therefrom to constitute the foremost end. A controller configured to control operation of the rotary drive motor 54 and a power source configured to supply power for operation are provided inside or outside the housing 11, although not illustrated. A photosensor etc. configured to detect falling of medicine pieces through the discharge port 14 is provided to transmit a detection signal to the controller or a tablet counter.

The controller controls rotation by starting with low-speed rotation and transitioning to high-speed rotation when discharge of a predetermined number of medicine pieces are discharged, the number being set in advance, after discharge of a first medicine piece is detected. The number of remaining medicine pieces is calculated from the total number of medicine pieces to be discharged, the number being specified in advance, and the number of medicine pieces that have been discharged. When the number of remaining medicine pieces reaches a predetermined number that has been specified, the rotational speed is reduced, or reverse rotation is performed in order to prevent undesired falling of excessive medicine pieces after discharge of medicine pieces is completed.

Operation etc. of the medicine feeder 10 will be described with reference to the drawings. Medicine pieces 5 are occasionally referred to as a "sample medicine piece 5a", "randomly accommodated medicine pieces 5b", and "aligned medicine pieces 5c", depending on the situation in which the medicine pieces 5 are placed. In order to consecutively feed a large number of medicine pieces 5 using the medicine feeder 10 (see FIG. 12), the width of the medicine transfer path has been regulated and medicine pieces have been input in a random manner in advance. The work of regulating the width of the medicine transfer path is performed by a person in charge of the work performing the simple work of selecting an appropriate one of a large number of medicine pieces 5 as a sample medicine piece 5a, placing the sample medicine piece 5a in the sample placement site 74, and adjusting the position of the link mechanism 73 such that one end of the link mechanism 73 abuts against the sample medicine piece 5a.

When this work is performed, both the first regulating member 71 and the second regulating member 72 operate in conjunction with the link mechanism 73, and the width of the medicine transfer path on the annular upper end surface 23 of the outer rotary body 20 is reduced to a width corresponding to the diameter of the sample medicine piece 5a at two locations by the free end portions of the first regulating member 71 and the second regulating member 72.

When the medicine feeder 10 is caused to operate in a simple continuous feed mode etc., for example, the rotary drive member 51 is axially rotated. This rotational motion is transferred to the outer rotary body 20 through friction gearing via the first transfer member 42, and also transferred to the inner inclined rotary body 30 through friction gearing via the second transfer member 43, to rotate the first transfer member 42 and the second transfer member 43 in the same direction. The first transfer member 42 is rotated faster than the second transfer member 43.

When the inner inclined rotary body 30 is axially rotated, medicine pieces 5 located on the inclined portion 33 of the inner inclined rotary body 30, among the randomly accommodated medicine pieces 5b accumulated at the inner bottom of the rotary container (20+30), are scooped up from a low position to a high position through circulation motion of the inclined portion 33 in a sawtooth shape. As illustrated in FIG. 12B, most of the medicine pieces 5 that have been carried to a location at which the inclined portion 33 is higher than the annular upper end surface 23 of the outer rotary body 20 are moved onto the annular upper end surface 23 through sliding or rolling based on the inclination of the inclined portion 33.

Since the outer rotary body 20 is rotating faster than the inner inclined rotary body 30, the medicine pieces 5 on the annular upper end surface 23 are scattered to a certain degree according to the difference in the rotational speed when the medicine pieces 5 are moved from the inclined portion 33 onto the annular upper end surface 23. When the medicine pieces 5 are small, some medicine pieces 5 may be arranged in a vertical line, and others may be arranged laterally or obliquely laterally. When the medicine pieces 5 are carried to the first regulating member 71 through rotation of the outer rotary body 20, the medicine pieces 5 arranged in line pass by the first regulating member 71, but the medicine pieces 5 arranged laterally interfere with the first regulating member 71 so that a medicine piece 5 on the inner side is pushed out from the top of the annular upper end surface 23 and falls down onto the inner inclined rotary body 30 to be returned to the randomly accommodated medicine pieces 5b. The medicine pieces 5 that have passed by the first regulating member 71 are thereafter carried to the second regulating member 72 through rotation of the outer rotary body 20, and forcibly aligned again in a similar manner.

The aligned medicine pieces 5c (see FIG. 13) that have cleared the two regulations and have been aligned in line are successively carried to the discharge guide 13 through circulation motion of the annular upper end surface 23 that accompanies rotation of the outer rotary body 20, and abut against the outer side surface of the discharge guide 13 which obliquely intersects the medicine transfer path on the annular upper end surface 23. Then, many of the aligned medicine pieces 5c are immediately advanced along the abutting side surface of the discharge guide 13 and aligned in line to be fed into the discharge port 14. The medicine pieces 5 fed into the discharge port 14 are accelerated by the gravity to fall at increasing speed, which increases the separation distance between the preceding and following medicine pieces 5. Thus, the medicine pieces 5 can be adequately counted by detecting the falling medicine pieces 5 using a photosensor etc. installed at a location at which the separation distance is long enough.

SUMMARY OF INVENTION

Technical Problem

With the medicine feeder according to the related art, it is not necessary to provide a fixed rectification guide in the rotary bodies, since the medicine pieces are aligned by the regulating mechanism. The range of common use of the medicine feeder according to the related art has been spreading for medicine pieces of a variety of shapes and sizes. As the range of common use is spread, such demand is increasing that the medicine feeder should be commonly used for medicine pieces not only of different shapes and sizes, but also of different materials.

In order to meet the above desire, it is first considered to reduce the rotational speed of the inner inclined rotary body. When the rotational speed of the inner inclined rotary body is reduced, however, the rate at which the medicine pieces are lifted through rotation of the inner inclined rotary body is reduced, which decreases the number per time of medicine pieces to be delivered from the inner inclined rotary body to the outer rotary body. When there are few medicine pieces at the inner bottom of the rotary container, in particular, single medicine pieces separated from a cluster are lifted in the inner inclined rotary body for a longer distance and a longer time, and therefore the number of medicine pieces that reach the outer rotary body based on the inertia is undesirably further decreased when the inner inclined rotary body is not rotated with momentum.

As the range of the common use is spread, such demand is also increasing that the medicine feeder should be commonly used for not only tablets in relatively stable shapes such as a circular plate shape and a disk shape, but also medicine pieces (hereinafter referred to as "easily rollable medicine pieces") in easily rollable shapes such as a spherical shape and a spindle shape. However, the easily rollable medicine pieces are rolled on the outer rotary body and are not stable in position or attitude when the medicine pieces are moved from the inner inclined rotary body to the outer rotary body, when the outer rotary body is rotated, etc., and it is necessary to add or enhance the function to suppress rolling of medicine pieces, as a part of the enhancement of the function of the medicine feeder to align medicine pieces, in order to allow the medicine feeder to be commonly used for the easily rollable medicine pieces. In order for such function enhancement, it is conceivable to enhance the sorting mechanism 60 and the regulating mechanism 70 discussed earlier that assume the medicine alignment function. However, a large number of members are already disposed at locations at which the sorting mechanism 60 and the regulating mechanism 70 are mounted, and it is burdensome to add a new member only for the rolling suppression function.

In the medicine feeder according to the related art, two regulating members, namely the first and second regulating members 71 and 72, configured to regulate the lateral width of medicine pieces that may pass through the medicine transfer path are mounted in a row on the front and rear sides in order to align solid medicine pieces in line in a stable attitude on the annular upper end surface of the outer rotary body, and the sorting mechanism 60 which regulates the height of the medicine pieces is placed in front of the regulating mechanism 70. The sorting mechanism 60 does not always reliably perform the height regulation, since the distal end portion thereof is swung to escape upward when the reaction force from the medicine pieces is so strong, in order to avoid damage etc. to the medicine pieces as discussed already. However, there is practically no critical inconvenience with the height regulation by the sorting mechanism 60, since such height regulation is pre-processing for reducing the burden on the width regulation by the regulating mechanism 70. As the range of common use is spread as discussed above, on the contrary, such demand is also increasing that the medicine feeder should be commonly used for not only medicine pieces of different shapes and sizes, but also medicine pieces of different materials such as hard medicine pieces, medicine pieces with a fragile surface layer, medicine pieces in easily rollable shapes such as a spherical shape and a spindle shape, etc. In order to also handle fragile medicine pieces and easily rollable medicine pieces to meet such a demand, it is requested to make a sorting member in the sorting mechanism sensitive and diversified, in order to lessen contact between the medicine pieces and the sorting member. However, such measures tend to weaken the height regulation function of the sorting member in the sorting mechanism, and therefore it is requested to maintain the height regulation function.

In order to maintain and enhance the height regulation function, it is conceivable to provide a plurality of sorting members for height regulation, as with the regulating mechanism for width regulation, and arrange the sorting members along the annular upper end surface of the outer rotary body. However, a large number of members are already provided in a row on a peripheral portion of the annular upper end surface of the outer rotary body that assumes transfer of medicine pieces, and it is not preferable to additionally insert a new member into the row to increase the length of the row.

In the current state of the art, operation of the medicine feeder is temporarily stopped in the middle of the operation in order to replenish medicine pieces in the middle of a process when only one medicine feeder can be used for one kind of medicine pieces, while medicine pieces can be accommodated in a distributed manner when a plurality of medicine feeders can be allocated to one kind of medicine pieces. When a large number of medicine feeders that accommodate various kinds of medicine pieces are mounted on a medicine dispensing apparatus etc., rather than when a medicine feeder to be replenished is used singly, operation of the large number of other medicine feeders is also stopped, which causes a significant impact. Thus, it is requested to implement a medicine feeder that can easily increase an amount of medicine pieces to be accommodated therein.

An object of the present invention is to provide a medicine feeder capable of efficiently feeding medicine pieces even when rotation of an inner inclined rotary body is reduced.

Another object of the present invention is to provide a medicine feeder capable of efficiently feeding medicine pieces that are easily rollable by improving an outer rotary body.

Still another object of the present invention is to provide a medicine feeder that readily increases an amount of medicine pieces to be accommodated therein.

Yet another object of the present invention is to provide a medicine feeder that is not likely to cause undesired discharge of excessive medicine pieces.

Solution to Problem

In the following, the solution to the problem will be described using reference numerals used in the drawings in order to facilitate understanding of the present invention. The reference numerals used in this section should not be construed to limit the present invention.

The present invention provides a medicine feeder including an outer rotary body 200, an inner inclined rotary body 300, and a regulating mechanism 700. The outer rotary body 200 has therein an internal space 220 that has an opening portion 220A opening upward and an annular upper end surface 230 that surrounds the opening portion 220A, the outer rotary body 200 being rotatable about a virtual vertical line CL1 that extends in an up-down (or vertical) direction within the internal space. The inner inclined rotary body 300 is disposed in the internal space 220 of the outer rotary body 200 capable of rotating about a virtual inclined line CL2, which is inclined with respect to the vertical line CL1, A plurality of solid medicine pieces are placed on an upper surface portion of the inner inclined rotary body 300, and the inner inclined rotary body 300 moves the plurality of medicine pieces onto the annular upper end surface 230 of the outer rotary body when the inner inclined rotary body 300 is rotated. The regulating mechanism 700 is operable to align the plurality of medicine pieces, which have been moved onto the annular upper end surface 230 of the outer rotary body, along a rotational direction of the annular upper end surface when the outer rotary body is rotated. In the medicine feeder according to the present invention, a plurality of delivery portions 340 and a plurality of push-up portions 350 are formed in a peripheral edge region of the upper surface portion 320 of the inner inclined rotary body 300 and arranged alternately one by one in a circumferential direction. The plurality of delivery portions 340 each have a downward slope 341 that slopes downward toward an outer side even at an elevated position, and the plurality of push-up portions 350 each have no downward slope. When one or more of the medicine pieces are disposed on the downward slope at the elevated position, the plurality of delivery portions 340 are each capable of letting the medicine pieces ride onto the annular upper end surface 230 of the outer rotary body 200 using the downward slope 341. The push-up portions 350 are each capable of pushing up the one or more medicine pieces disposed on the delivery portion 340 located in front of the push-up portion 350 in a direction of forward rotation of the inner inclined rotary body 300 to the elevated position.

The vertical line described above is a virtual line, and is typically a plumb line discussed earlier. However, the vertical line may be slightly tilted from the plumb line as long as the medicine piece transfer function of the outer rotary body is not impaired.

In the medicine feeder according to the present invention, the plurality of delivery portions 340 each having the downward slope 341 and the plurality of push-up portions 350 each having no downward slope are formed in the peripheral edge region of the upper surface portion of the inner inclined rotary body, and arranged alternately one by one in the circumferential direction. Thus, a step is formed at the boundary portion between the delivery portions 340 and the push-up portions 350. That is, the push-up portions 350 are higher than the delivery portions 340. Therefore, when a delivery portion 340 in the peripheral edge region reaches the lowermost position along with rotation of the inner inclined rotary body, medicine pieces quickly ride onto the delivery portion. Then, along with rotation of the inner inclined rotary body 300, the medicine pieces on the delivery portion 340 are pushed forward by a push-up portion 350 (a stepped surface, in particular) on the rear side with respect to the delivery portion 340. As a result, the medicine pieces can be pushed up onto the annular upper end surface 230 of the outer rotary body 200 with a high probability, irrespective of whether the number of medicine pieces is large or small and irrespective of whether the rotational speed of the inner inclined rotary body is high or low. Thus, according to the present invention, it is possible to implement a medicine feeder capable of efficiently feeding medicine pieces even when rotation of the inner inclined rotary body is reduced.

The elevated position is defined such that an end edge of each downward slope 341 of the delivery portions 340 of the inner inclined rotary body coincides with or is located above the annular upper end surface 230 at the elevated position. At this position, medicine pieces on the downward slope 341 are smoothly moved to the annular upper end surface of the outer rotary body.

Preferably, an inclination angle of each downward slope 341 is constant over the entire region of the delivery portions 340. Preferably, the push-up portions 350 each include a rising portion 350A formed continuously with an end portion of the delivery portion located in a direction of reverse rotation of the inner inclined rotary body. The rising portion 350A serves as a stopper portion for medicine pieces in easily rollable shapes such as a spherical shape and a spindle shape to exhibit the function to pushup such medicine pieces. Preferably, the rising portion 350A has a rising surface that is continuous with the downward slope 341 and that extends in the same direction as a direction in which the virtual inclined line CL2 extends. The rising surface constitutes a reliable stopper portion.

The plurality of delivery portions 340 are each composed of a first delivery portion 340A and a second delivery portion 340B arranged alternately in a circumferential direction of the peripheral edge region. The inner inclined rotary body 300 includes projecting portions 360 each composed of a first projecting portion 361 and a second projecting portion 362, the first projecting portion 361 projecting from a first portion of the upper surface portion 320 that is adjacent to the peripheral edge region, and the second projecting portion 362 projecting from a second portion that is continuous with the first projecting portion 361 and that extends to an outer peripheral edge of the upper surface portion. The first delivery portion 340A is formed such that the upper surface portion 320 and the downward slope 340A of the inner inclined rotary body are continuous. The second delivery portion 340B is formed such that at least a part of the downward slope 340A extends to an outer surface of the first projecting portion 361. Preferably, the rising surface of the rising portion 350A extends to an outer surface of the second projecting portion 362. When such projecting portions 360 each composed of the first projecting portion 361 and the second projecting portion 362 are provided, medicine pieces are blocked by the projecting portions 361 and 362 when medicine pieces on the delivery portion 340 are about to fall by their own weight toward the upper surface portion 320 which is adjacent to the peripheral edge region. Thus, the enhanced push-up capability can be maintained. Therefore, even medicine pieces in easily rollable shapes such as a spherical shape and a spindle shape, for example, can be adequately pushed up to a location higher than the annular upper end surface 230 of the outer rotary body with a high probability.

Preferably, an urging section 321 is provided on a portion of the upper surface portion 320 of the inner inclined rotary body 300 that is located inward with respect to the peripheral edge region. The urging section 321 is capable of generating a friction force in the circumferential direction of the inner inclined rotary body to urge the plurality of medicine pieces to be stirred on the upper surface portion 320 and also to urge the medicine pieces to move rolling in a direction toward the first delivery portions 340A. The urging section 321 may be composed of a plurality of wavy uneven portions arranged in the circumferential direction and extending toward the first delivery portions 340A. When such an urging section 321 is provided, a friction force, even if small, acts on the medicine pieces placed on the upper surface portion 320 of the inner inclined rotary body 300 from the inner inclined rotary body when the inner inclined rotary body is rotated, and the medicine pieces are stirred accordingly. The urging section 321 also allows the medicine pieces to smoothly ride onto the first delivery portions 340A when the inner inclined rotary body is rotated.

The medicine feeder may further include: a falling medicine detecting section 560 capable of detecting the falling medicine pieces discharged after being aligned on the annular upper surface portion of the outer rotary body 200; and a controller 570 configured to detect intervals of falling of the medicine pieces judging from an output of the falling medicine detecting section and to control rotation of at least one of the inner inclined rotary body 300 and the outer rotary body 200 according to the intervals. Preferably, the controller 570 has a function of individually reversing a rotational direction of the inner inclined rotary body 300 and a rotational direction of the outer rotary body 200, and temporarily reverses rotation of the inner inclined rotary body according to falling of the medicine pieces detected by the falling medicine detecting section 560 while rotating the outer rotary body 200 forward. By configuring the inner inclined rotary body 200 and the outer rotary body 300 to be individually rotatable in reverse and rotating the inner inclined rotary body 300 in reverse while rotating the outer rotary body forward, a stirring effect that could not be obtained by simply rotating the inner inclined rotary body forward can be obtained by rotating the inner inclined rotary body in reverse without reducing the speed of transfer of medicine pieces by the outer rotary body. In particular, the first projecting portions 361 and the second projecting portions 362 of the inner inclined rotary body 300 exhibit a large stirring effect during reverse rotation.

The medicine feeder occasionally further includes a discharge guide 13 provided in rear of the regulating mechanism 700 to guide the medicine pieces on the annular upper end surface 230 of the outer rotary body from an inner peripheral side to an outer peripheral side of the annular upper end surface and to feed the medicine pieces into a discharge port 14 for the falling medicine pieces. In this case, preferably, the outer rotary body 200 includes a plurality of grooves 231 arranged at predetermined intervals in the circumferential direction on the annular upper end surface 230, the plurality of grooves each extending in a radial direction and including a widened portion 231A with an increased width at an intermediate portion in the radial direction. Preferably, the plurality of grooves are shaped to become narrower toward an inner peripheral edge and an outer peripheral edge of the annular upper end surface 230 with respect to the widened portion 231A. With this configuration, when easily rollable medicine pieces are rolled in the circumferential direction of the outer rotary body through rotation of the outer rotary body, the medicine pieces are trapped in the nearby grooves 231 while being moved. Then, the medicine pieces are guided by the grooves 231 from a location with a narrow groove width to a location with a wide groove width, where the medicine pieces are stabilized. Therefore, the function to suppress rolling of easily rollable medicine pieces is enhanced. According to the present invention, a desired rolling suppression function is easily exhibited without adding a separate member to the location at which the sorting mechanism 600 or the regulating mechanism 700 is disposed or in the vicinity thereof. Thus, according to the present invention, it is possible to implement a medicine feeder capable of efficiently feeding even easily rollable medicine pieces by improving the outer rotary body. The plurality of grooves 231 may reach the inner peripheral edge of the annular upper end surface 230.

A bay-shaped recessed portion 233 may be formed in the annular upper end surface 230 of the outer rotary body 200 between two adjacent grooves 231, the recessed portion 233 becoming deeper toward the inner peripheral edge to open radially inward at the inner peripheral edge.

Preferably, the controller 570 performs control so as to reduce the rotational speed of the outer rotary body 200 when the falling medicine detecting section 560 detects falling and discharge of one medicine piece immediately before completion of discharge, and to temporarily stop or temporarily reverse rotation of the outer rotary body 200 when the falling medicine detecting section 560 detects completion of discharge of the last medicine piece. By performing such control, it is possible to provide a medicine feeder that is not likely to cause undesired discharge of excessive medicine pieces.

An annular inclined surface 232 may be formed at the outer peripheral edge of the annular upper end surface 230 of the outer rotary body, the annular inclined surface sloping down toward a radially outer side over the entire circumference, and the plurality of grooves 231 may extend into the annular inclined surface. With this configuration, when the medicine pieces on the outer rotary body 200 are urged in the radially outward direction by the discharge guide 13 etc., the medicine pieces that have been stabilized in the grooves 231 are accelerated by the inclination of the annular inclined surface 232 immediately after the medicine pieces come off the grooves, and thus the medicine pieces are fed smoothly and speedily in the radially outward direction from the outer rotary body, even if rolling of the medicine pieces on the outer rotary body is suppressed.

Preferably, the virtual vertical line CL1 which serves as a center of rotation of the outer rotary body is inclined by an angle β with respect to a plumb line, a direction of inclination of the virtual vertical line CL1 being determined so as to elevate a portion of the outer rotary body closer to the discharge port 14 for the falling medicine pieces, and the angle β is smaller than an inclination angle α of the inclined surface 232. By slightly tilting the outer rotary body 200 in the direction of elevating a portion of the outer rotary body closer to the discharge port 14, the medicine pieces being transferred and about to fall are urged by the tilt of the outer rotary body 200 to be brought closer to the discharge guide side from the discharge port 14 side. As a result, the occurrence of an undesired event that the medicines reach the discharge port earlier than expected because of excessive rolling etc. of the medicine pieces is adequately suppressed. Moreover, the inclination of the entire outer rotary body and hence the inclination of the annular upper end surface 230 are smaller than the tilt of the inclined surface 232 at the outer peripheral portion of the annular upper end surface 230 of the outer rotary body (the angle β is smaller than the inclination angle α of the inclined surface), and thus the urging function of the inclined surface 232 is maintained, rather than being impaired.

A plurality of uneven portions (234, 235) may be formed in a scattered point pattern between adjacent two of the grooves 231. When the plurality of uneven portions (234, 235) in a scattered point pattern are provided, the medicine pieces are not easily slid, even when the outer rotary body is rotated at a reduced speed or driven in reverse, because of the effect of the plurality of uneven portions in a scattered point pattern with high sliding resistance. Therefore, the speed of forward feed by the outer rotary body can be increased. Thus, with this configuration, it is possible to implement a medicine feeder capable of efficiently feeding medicine pieces, whether or not the medicine pieces are easily rollable.

When an annular inclined surface 232 that slopes downward toward the radially outer side is formed over the circumference at the outer peripheral edge of the annular upper end surface 230 of the outer rotary body 200, and a bay-shaped recessed portion 233 is formed between two adjacent grooves 231, the recessed portion 233 becoming deeper toward the inner peripheral edge, the plurality of uneven portions (234, 235) may be formed between the recessed portions 233 and the annular inclined surface 232 and in all the regions surrounded by the grooves 231, the recessed portions 233, and the annular inclined surface 232. A plurality of uneven portions (234, 235) may be formed in all the regions surrounded by the grooves 231, the recessed portions 233, and the annular inclined surface 232. With this configuration, it is possible to improve the performance to feed medicine pieces that are not easily rollable without impairing the function to feed easily rollable medicine pieces. With this configuration, it is possible to improve the performance to feed medicine pieces that are not easily rollable without impairing the function to feed easily rollable medicine pieces.

The medicine feeder may further include a sorting mechanism 600 operable to align the plurality of solid medicine pieces, which have been carried onto the annular upper end surface 230 of the outer rotary body 200 by means of rotation of the inner inclined rotary body 300, when the outer rotary body is rotated. The sorting mechanism 600 is configured to regulate a height of the plurality of medicine pieces on the annular upper end surface 230 of the outer rotary body 200. The regulating mechanism 700 may be configured to regulate a position in a direction of a lateral width, as well as the height, of the plurality of medicine pieces on the annular upper end surface of the outer rotary body. Thus, in the configuration of the sorting mechanism 600 operable to align the medicine pieces during rotation of the outer rotary body 200 and the regulating mechanism 700, not only the sorting mechanism 600 regulates the height of the medicine pieces, but also the regulating mechanism 700 which originally has the function to regulate the width of rotating medicine pieces arranged in line additionally regulates the height of the medicine pieces. As a result, it is possible to enhance the height regulation during alignment of the medicine pieces arranged in line on the annular upper end surface 230 of the outer rotary body.

The regulating mechanism 700 reduces a width of a medicine transfer path on the annular upper end surface 230 of the outer rotary body from an outer peripheral side. The regulating mechanism includes a height regulating portion 712 that faces the annular upper end surface with a predetermined clearance and a width regulating portion 711 that projects over the annular upper end surface to regulate the width of the medicine transfer path. When the regulating mechanism 700 includes the height regulating portion 712 and the width regulating portion 711 each constituted of a stepped portion in order to exhibit the height regulation function, the amounts of inward projection of the stepped portions may be made different to implement the respective functions.

The regulating mechanism 700 includes a mechanism that variably adjusts the position of the width regulating portion 711 to variably adjust the width of the medicine transfer path according to the lateral width of the medicine pieces. Specifically, the amount by which the width of the medicine transfer path is to be narrowed by the regulating mechanism 700 can be adjusted easily and appropriately by placing a sample medicine piece that is the same as the medicine pieces to be consecutively discharged in the sample placement site 74 and causing the regulating mechanism 700 to follow the sample medicine piece. Preferably, a lid that opens and closes the sample placement site is further provided. When such a lid is provided, the lid holds the sample medicine piece not to be lifted, even when a push-up force is applied to the sample medicine piece accommodated in the sample placement site by causing a link member for following the sample medicine piece to abut against the sample medicine piece, manually, by a spring force, etc. Thus, it is possible to appropriately prevent the occurrence of an undesired event that the sample medicine piece jumps out of the sample placement site. When the lid for the sample placement site is transparent, it is possible to visually check if the sample medicine piece is not placed by mistake or is left by mistake.

The sorting mechanism 600 may include one or more suspended objects 612 suspended from above the annular upper end surface 230 of the outer rotary body 200 and deformable when a lower end portion of the one or more suspended objects 612 is pushed sideways. The one or more suspended objects 612 regulate the height of the medicine pieces on the annular upper end surface 230. When such suspended portions that are relatively easily deformable are adopted, contact of the sorting members with the medicine pieces on the annular upper end surface of the outer rotary body is relieved.

The one or more suspended objects 612 may be formed by loosely coupling a plurality of balls or spherical bodies 613. Chain members with both an appropriate weight and a deformation ability formed by loosely coupling a plurality of balls or spherical bodies are available in the market, and thus it is possible to easily implement a desired sorting mechanism.

Preferably, the one or more suspended objects include a plurality of suspended objects 612 located at different positions in a radial direction of the outer rotary body. Preferably, alternatively, the plurality of suspended objects 622, 632 are located at different positions in the circumferential direction of the outer rotary body. When a plurality of suspended portions are distributed in the radial direction or the circumferential direction, the plurality of suspended portions contact the medicine pieces with a sufficient total contact force, even if contact of the individual suspended portions with the medicine pieces has been relieved, and thus a necessary height regulation function can be exhibited.

The one or more suspended objects 622, 632 may include a suspended object suspended from a support member 621 that extends over the regulating mechanism, one end of the support member 621 being mounted to a radially outer side of the outer rotary body and the suspended object being suspended from the other end of the support member 621. The suspended object 632 may be located at a side of the regulating mechanism 700, and the regulating mechanism may be provided with an attracting member 640 configured to exert a force to attract the suspended object 632. When the regulating mechanism is provided with the attracting member 640 so that the suspended portions 632 arranged side by side are attracted toward the regulating member, it is possible to readily enhance the function of the laterally arranged suspended portions and suppress swing of the laterally arranged suspended portions while avoiding an increase in size.

The plurality of suspended objects 622, 632 may include suspended objects of different sizes. While the suspended objects 622 of a large size exert a relatively strong regulation force but tend to strongly contact the medicine pieces, the suspended objects 633 of a small size exert only a relatively weak regulation force but weakly contact the medicine pieces. Thus, providing suspended objects of different sizes can disperse the magnitude and the application position of the regulation force, and thus increase the diversity of the height regulation.

Out of the plurality of suspended objects, preferably, a lower end of a suspended object 622 with larger balls or spheres is located higher than a lower end of a suspended object 632 with smaller balls or spheres. The strength and weakness of engagement between the suspended object and the medicine pieces is varied according to whether the lower end position of the suspended object is high or low. By locating the lower end of the suspended object 622, which relatively strongly contacts the medicine pieces, higher and locating the lower end of the suspended object 633, which relatively weakly contacts the medicine pieces, lower, the degree of contact between the suspended portion and the medicine pieces can be uniformized to readily avoid excessively strong contact of some suspended portions while improving the diversity of the height regulation.

The medicine feeder may further include: a manual adjustment mechanism 650 operable to variably adjust a height of regulation by the sorting mechanism 600 through a manual operation; and a lower limit setting mechanism 651 operable to mechanically set a lower limit of a range of adjustment by the manual adjustment mechanism 650 by sandwiching the medicine piece or a substitute for the medicine piece. The basic lower limit of the range of adjustment by the manual adjustment mechanism 650 can be set easily and appropriately by placing a sample medicine piece 5a that is the same as the medicine pieces to be consecutively discharged or a substitute for the medicine pieces in the lower limit setting mechanism and causing the lower limit setting mechanism to follow the sample medicine piece 5a or the substitute. A fine adjustment can be easily made by operating the manual adjustment mechanism 650 when it is desired to slightly raise the height of regulation based on trial operation, actual operation, etc. Further, the height of regulation can be lowered from the basic lower limit by operating the manual adjustment mechanism 650 after the sample medicine piece etc. is taken out of the lower limit setting mechanism 651.

The medicine feeder may further include a scale member 652 configured to indicate the height of regulation by the sorting mechanism 600 adjusted by the manual adjustment mechanism 650. When the scale member 652 is provided, by memorizing or recording a scale value after adjustment, it is possible to readily make an adjustment to the scale value without the need to place a sample medicine piece or a substitute in the lower limit setting mechanism 651.

The medicine feeder may further include: a housing 11 that includes a peripheral wall that rotatably accommodates the outer rotary body therein; and an internal space expansion member 800 mounted on top of the peripheral wall 11C of the housing to expand the internal space 220 of the outer rotary body upward. The amount of medicine pieces to be accommodated in the rotary container can be readily increased by adding the internal space expansion member 800 when the amount of medicine pieces to be accommodated is not enough.

Preferably, the internal space expansion member 800 includes a flange portion 810 having a through hole 811 corresponding to the opening portion 220A of the internal space 220 of the outer rotary body 200 and fixed to an upper end portion of the peripheral wall 11C of the housing 11, and a tubular portion 820 rising from a peripheral edge portion of the through hole 811 and extending upward from the flange portion to extend the internal space 220 upward. With this configuration, the tubular portion rises up from the through hole 811, which is equivalent to a state in which the opening portion of the rotary container is extended upward and to a state in which the amount of medicine pieces to be accommodated in the rotary container is increased.

Preferably, the internal space expansion member 800 further includes a suspended portion 830 extending into the internal space 220 of the outer rotary body 200. The suspended portion 830 extends into the internal space 220 with the suspended portion 830 being located at a side of the regulating mechanism 700 not to interfere with the regulating mechanism 700, the inner inclined rotary body 300, or the outer rotary body 200 when the flange portion 810 is fixed to a top plate 11A located at the upper end portion of the peripheral wall 11C of the housing 11. When such a suspended portion 830 is provided, it is possible to prevent the occurrence of an inconvenient event in which medicine pieces slide onto a portion of the annular upper end surface 230 of the outer rotary body on which the regulating mechanism 700 acts, from a space inside or below the tubular portion 820 of the internal space expansion member 800.

The medicine feeder may further include: a falling medicine detecting section 560 for detecting falling of the medicine pieces discharged after being aligned; and a controller 570 configured to variably control a rotational speed of the outer rotary body according to detection by the falling medicine detecting section 560. In this case, the controller 570 has a function of estimating medicine sizes of the medicine pieces by detecting a time length of falling of one medicine piece judging from an output of the falling medicine detecting section 560, and a function of changing the rotational speed of the outer rotary body 200 according to an estimated value of the medicine size. When the controller 570 is configured to estimate a medicine size according to the time length of falling of a discharged medicine piece, the falling medicine detecting section 560 can be used not only to detect the presence or absence of a falling medicine piece but also to measure the size of a medicine piece. As a result, it is possible to avoid undesired complication, such as addition of a new detection member or replacement of a detection member with a high-quality article, or a cost increase.

The controller 570 may be configured to change the rotational speed of the outer rotary body and a rotational speed of the inner inclined rotary body from high speed to low speed during initial operation before the estimated value is obtained. With this configuration, the medicine size is not known at all to the controller during initial operation in which the controller operates for the first time after medicine pieces are input into an empty rotary container. Thus, in the related art, low-speed rotation on the safer side is continuously performed since the start of operation until the detection of discharge of the first medicine piece, which takes a long time for the initial operation. If at least the former half of the initial operation is sped up, the time for the initial operation is accordingly shortened, which improves efficiency. Specific examples of the timing to switch the rotational speed from high speed to low speed typically include the timing when the time required for medicine pieces to be lifted from the bottom to the edge in the rotary container has elapsed, the timing when the time since delivery of medicine pieces from the inner inclined rotary body to the outer rotary body until the medicine pieces are carried to a position at which the regulating mechanism first acts, and a combination thereof.

The controller 570 may be configured to determine whether the rotational speed is high or low according to whether the estimated value is large or small when the rotational speed is changed after the estimated value is obtained. Multiple medicine pieces are more likely to fall as the size of the medicine pieces is smaller compared to the discharge port of a constant size. In a situation in which falling of multiple medicine pieces occurs, the two rotary bodies are rotated at high speed when the estimated value of the medicine size is large. When the estimated value of the medicine size is small, the two rotary bodies are rotated at low speed. By adopting this configuration, it is possible to prevent undesired falling of multiple medicine pieces conveniently and adequately.

The medicine feeder may further include a rotary drive mechanism (541, 542) operable to rotate the inner inclined rotary body and the outer rotary body. The rotary drive mechanism may be capable of individually reversing a rotational direction of the inner inclined rotary body 300 and a rotational direction of the outer rotary body 200 according to a command from the controller 570. In this case, the controller 570 may have a function of temporarily reversing rotation of the inner inclined rotary body when the outer rotary body is rotated forward and the falling medicine detecting section 560 is detecting falling of the medicine pieces. The effect of stirring medicine pieces can be obtained when rotation of the inner inclined rotary body and rotation of the outer rotary body can be individually reversed and rotation of the inner inclined rotary body is temporarily reversed while the outer rotary body is rotated forward during discharge of medicine pieces.

In the medicine feeder including a falling medicine detecting section capable of detecting the falling medicine pieces discharged after being aligned and a controller 570 configured to control the rotational speed and the rotational direction of the outer rotary body according to the detection by the falling medicine detecting section, the controller 570 may perform control so as to reduce a rotational speed of the outer rotary body 200 when the falling medicine detecting section 560 detects falling and discharge of one medicine piece immediately before completion of discharge, and to temporarily stop or temporarily reverse rotation of the outer rotary body 200 when the falling medicine detecting section 560 detects completion of discharge of the last medicine piece. By adopting this configuration, it is possible to prevent undesired falling of multiple medicine pieces conveniently and adequately.

BRIEF DESCRIPTION OF DRAWINGS

FIG. 2 illustrates the structure of an outer rotary body of the medicine feeder, wherein

FIG. 4 illustrates the structure of a regulating mechanism of the medicine feeder, wherein

FIG. 5 illustrates the structure of a sorting mechanism of the medicine feeder, wherein

FIG. 6 illustrates the structure of an internal space expansion member of the medicine feeder, in which

FIG. 7 illustrates the overall structure of the medicine feeder, wherein

FIG. 9 illustrates the overall structure of a medicine feeder according to the related art, in which

FIG. 10 illustrates the medicine feeder according to the related art, wherein

FIG. 12 illustrates the medicine feeder according to the related art in an operation state in which alignment of accommodated medicine pieces has been started, wherein

FIG. 13 illustrates the medicine feeder according to the related art in an operation state in which the aligned medicine pieces are fed to a discharge port, wherein

DESCRIPTION OF EMBODIMENTS

Figure 1A:
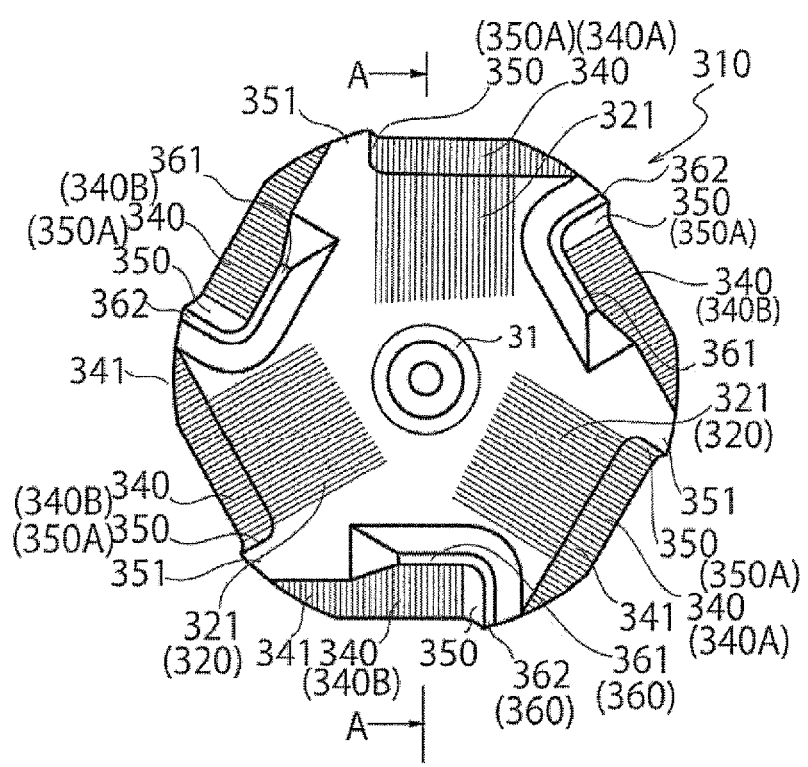
FIG. 1A is a plan view of an inner inclined rotary body of a medicine feeder.
Figure 1B:
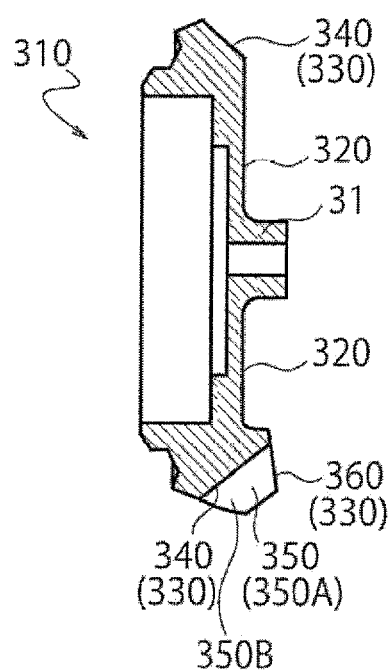
FIG. 1B is a sectional view of the inner inclined rotary body in FIG. 1A as taken along line A-A.
Figure 1C:
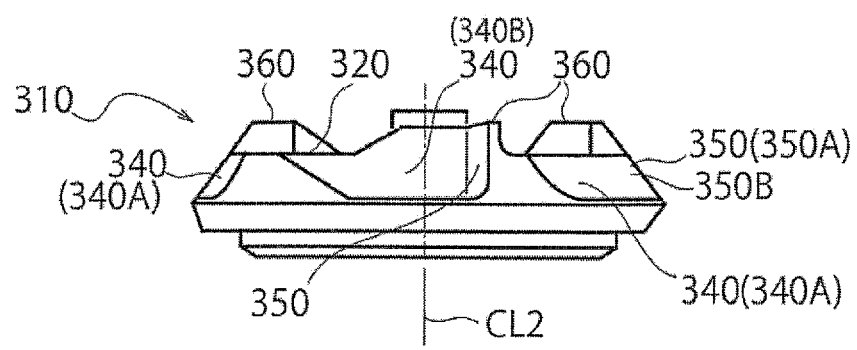
FIG. 1C is a front view of the inner inclined rotary body.
Figure 1D:
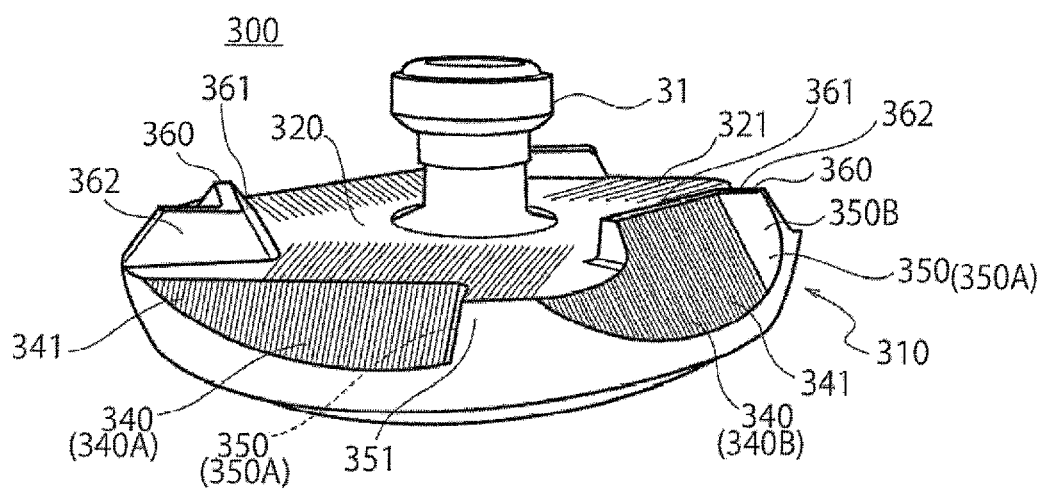
FIG. 1D is a perspective view of the inner inclined rotary body.

An embodiment of the present invention will be described in detail below with reference to the drawings.

FIGS. 1 to 8 illustrate the configuration of a medicine feeder 100 according to the embodiment of the present invention. Portions in FIGS. 1 to 8 that are generally the same as those of the medicine feeder 10 according to the related art illustrated in FIGS. 9 to 13 are given reference numerals that are the same as those used in FIGS. 9 to 13. A housing 11, a discharge guide 13, a discharge port 14, a support mechanism 40, and the entire arrangement of the members may be substantially the same as those of the medicine feeder according to the related art, and will not be repeatedly described.

The outer rotary body 20, the inner inclined rotary body 30, the rotary drive mechanism 50, the sorting mechanism 60, and the regulating mechanism 70 (see FIGS. 9 to 11) of the medicine feeder according to the related art have been modified into an outer rotary body 200, an inner inclined rotary body 300, a rotary drive mechanism 500, a sorting mechanism 600, and a regulating mechanism 700, respectively, and new such components will be discussed in detail mainly for differences from the related art.

First, an overview of the configuration of the present embodiment will be described. As illustrated in FIG. 8, the medicine feeder 100 according to the present embodiment includes an outer rotary body 200, an inner inclined rotary body 300, a sorting mechanism 600, and a regulating mechanism 700. As illustrated in FIGS. 2 and 8, the outer rotary body 200 has therein an internal space 220 that has an opening portion opening upward and an annular upper end surface 230 that surrounds the opening portion 220A, and is rotatable about a virtual vertical line CL1 that extends in the up-down (or vertical) direction within the internal space 220. As illustrated in FIG. 8, the inner inclined rotary body 300 is disposed in the internal space 220 of the outer rotary body 200 capable of rotating about a virtual inclined line CL2, which is inclined with respect to the vertical line CL1, with a plurality of solid medicine pieces being placed on an upper surface portion 320 of the inner inclined rotary body 300. The inner inclined rotary body 300 moves the plurality of medicine pieces onto the annular upper end surface 230 of the outer rotary body 200 when the inner inclined rotary body 300 is rotated. The regulating mechanism 700 is operable to align the plurality of medicine pieces, which have been moved onto the annular upper end surface 230 of the outer rotary body 200, along the rotational direction of the annular upper end surface 230 when the outer rotary body 200 is rotated. The sorting mechanism 600 is configured to regulate the height of the plurality of medicine pieces on the annular upper end surface 230 of the outer rotary body 200.

In the medicine feeder according to the present embodiment, as illustrated in FIG. 1) six delivery portions 340 and six push-up portions 350 are formed in a peripheral edge region of the upper surface portion 320 of the inner inclined rotary body 300, and arranged alternately one by one in the circumferential direction, the delivery portions 340 each having a downward slope 341 that slopes downward toward the outer side even at an elevated position, and the push-up portions 350 each having no downward slope 341. The elevated position is defined such that an end edge of each downward slope 341 of the delivery portions 340 of the inner inclined rotary body 300 coincides with or is located above the annular upper end surface 230 at the elevated position. When one or more of the medicine pieces are disposed on the downward slope 341 at the elevated position, the six delivery portions 340 are each capable of letting the medicine pieces ride onto the annular upper end surface 230 of the outer rotary body 200 using the downward slope. The six push-up portions 350 are each capable of pushing up the one or more medicine pieces disposed on the delivery portion 340 located in front of the push-up portion 350 in the direction of forward rotation of the inner inclined rotary body 300 to the elevated position.

The constituent elements will be described in detail below. First, the inner inclined rotary body 300 illustrated in FIG. 1 is obtained by modifying the inner inclined rotary body 30 discussed earlier. FIGS. 1A to 1D illustrate the structure of the inner inclined rotary body 300 of the medicine feeder 100. FIGS. 1A to 1D are a plan view, a sectional view as taken along line A-A, a front view, and a perspective view of the inner inclined rotary body 300.

The inner inclined rotary body 300 is mainly composed of a body 310 generally in a disk shape, and includes a center projection 31 that is similar to that according to the related art at the center of the upper surface thereof.

The body 310 is generally flat on the upper surface portion 320 around the center projection 31. While the upper surface portion 320 may be recessed as with the upper surface portion 32 of the inner inclined rotary body 30 of the medicine feeder according to the related art, the upper surface portion 320 is generally flat in this example in consideration of strength, processing, etc. Preferably, an urging section 321 is provided on a portion of the upper surface portion 320 of the inner inclined rotary body 300 that is located inward with respect to the peripheral edge region. The urging section 321 is capable of generating a friction force in the circumferential direction of the inner inclined rotary body 300 to urge the plurality of medicine pieces to be stirred on the upper surface portion 320 and also to urge the medicine pieces to move rolling in a direction toward first delivery portions 340A to be discussed later. The urging section 321 is constituted of three groups of wavy uneven portions composed of a plurality of thin and long straight grooves arranged in the circumferential direction and extending toward the first delivery portions 340A. When such an urging section 321 is provided, a friction force, even if small, acts on the medicine pieces disposed on the upper surface portion 320 of the inner inclined rotary body 300 from the inner inclined rotary body 300 when the inner inclined rotary body 300 is rotated, and the medicine pieces are stirred accordingly. The urging section 321 also allows the medicine pieces to smoothly ride onto the delivery portions 340A when the inner inclined rotary body 300 is rotated.

In the body 310, as illustrated in FIG. 1, six delivery portions 340 and six push-up portions 350 are formed on an upper surface inclined portion 330 around the upper surface portion 320. The delivery portions 340 and the push-up portions 350 are formed alternately in the circumferential direction. The inclination angle of each downward slope 341 is constant over the entire region of the delivery portions 340. The push-up portions 350 each include a rising portion 350A formed continuously with an end portion of the delivery portion 340 located in the direction of reverse rotation of the inner inclined rotary body 300. The rising portion 350A serves as a stopper portion for medicine pieces in easily rollable shapes such as a spherical shape and a spindle shape to exhibit the function to push up such medicine pieces. The rising portion 350A has a rising surface 350B that is continuous with the downward slope 341 and that extends in the same direction as the direction in which the virtual inclined line CL2 extends.

The downward slope angle of the downward slope 341 of the delivery portions 340 is approximately 45°, which is larger than an inclination angle θ of the inner inclined rotary body 300 when mounted, The angle is approximately 20° to 30°. Therefore, even if the inner inclined rotary body 300 is mounted in the inclined state in the outer rotary body 200, the downward slope angle of the delivery portions 340 with respect to the horizontal is maintained at approximately 15° or more even at the elevated position at which the inclination of the delivery portion 340 is closest to the horizontal when the inner inclined rotary body 300 is rotated in the state described above. Wavy uneven portions that are similar to those of the urging section 321 described above are also formed on the delivery portions 340.

The six delivery portions 340 are each composed of a first delivery portion 340A and a second delivery portion 340B arranged alternately in the circumferential direction of the peripheral edge region. The inner inclined rotary body 300 includes three projecting portions 360 each composed of a first projecting portion 361 and a second projecting portion 362, the first projecting portion 361 projecting from a first portion of the upper surface portion 320 that is adjacent to the peripheral edge region, and the second projecting portion 362 projecting from a second portion that is continuous with the first projecting portion 361 and that extends to the outer peripheral edge of the upper surface portion 320. The first delivery portion 340A is formed such that the upper surface portion 320 and the downward slope 341 of the inner inclined rotary body 300 are continuous. The second delivery portion 340B is formed such that at least a part of the downward slope 341 extends to the outer surface of the first projecting portion 361. The rising surface 350B of the rising portion 350A extends to the outer surface of the second projecting portion 362. When such projecting portions 360 each composed of the first projecting portion 361 and the second projecting portion 362 are provided, medicine pieces are blocked by the first and second projecting portions 361 and 362 when medicine pieces on the delivery portion 340 are about to fall by their own weight to the side of the upper surface portion 320 which is adjacent to the peripheral edge region. Thus, the enhanced push-up capability can be maintained. Therefore, even medicine pieces in easily rollable shapes such as a spherical shape and a spindle shape, for example, can be adequately pushed up to a location higher than the annular upper end surface 230 of the outer rotary body 200 with a high probability.

While the projecting portions 360, may be provided for all the delivery portions 340 and the push-up portions 350, the projecting portions 360 are provided for only the second delivery portions 340B in this embodiment.

Figure 2A:
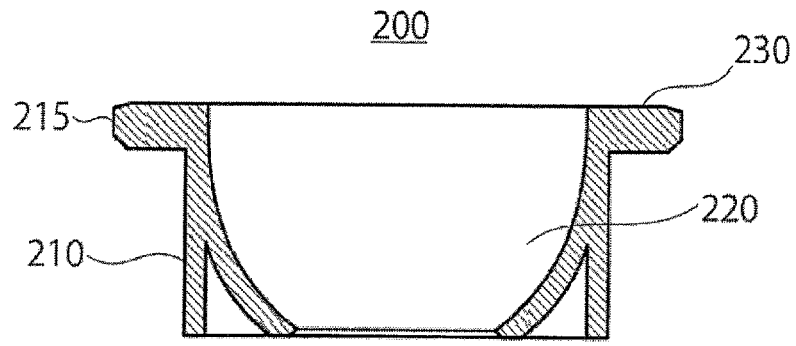
FIG. 2A is a vertical sectional view of the entire outer rotary body.
Figure 2B:
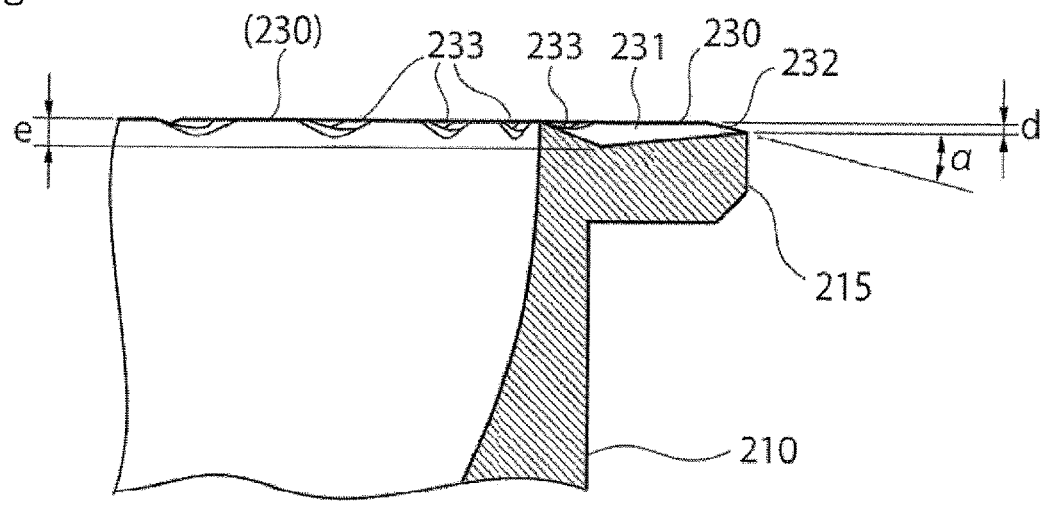
FIG. 2B is an enlarged view of a part of the outer rotary body.
Figure 2C:
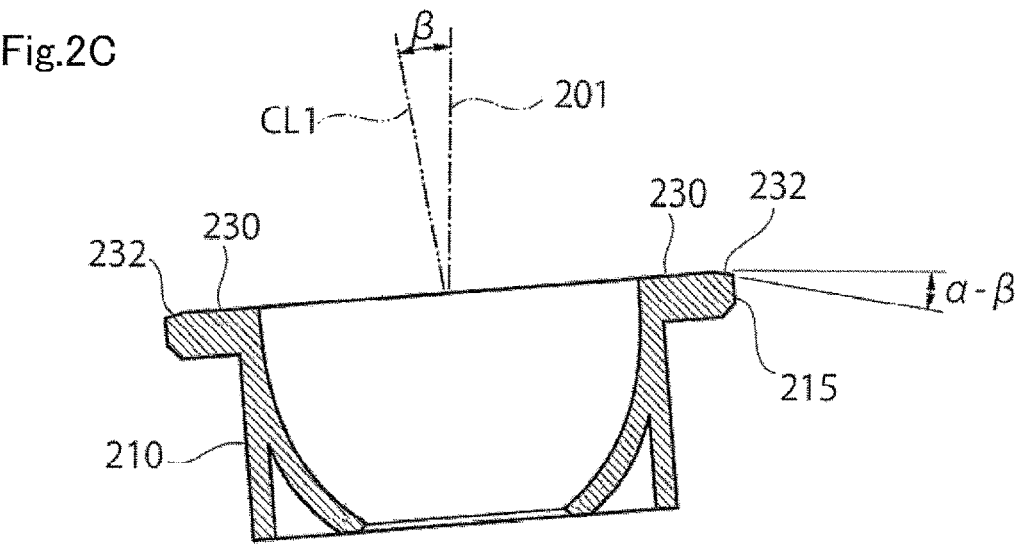
FIG. 2C is a vertical sectional view of the upper portion of the outer rotary body.

The outer rotary body 200 illustrated in FIGS. 2 and 3 is obtained by modifying the outer rotary body 20 discussed earlier. FIGS. 2A to 2C illustrate the structure of the outer rotary body 200 of the medicine feeder 100. FIG. 2A is a vertical sectional view of the outer rotary body 20. FIG. 2B is an enlarged vertical sectional view of the right end portion of the upper portion of FIG. 2A. FIG. 2C is a vertical sectional view of the outer rotary body 200 in the inclined state. FIG. 3A is a plan view of the annular upper end surface 230 of the outer rotary body 200. FIG. 3B is an enlarged view of a part of the annular upper end surface 230. FIG. 3C is a plan view of the annular upper end surface 230 of the outer rotary body 200 of a different type. FIG. 3D is an enlarged view of a part of the annular upper end surface 230 of the outer rotary body 200 of the different type.

In the outer rotary body 200 (see FIG. 2A), an upper portion 215 and a lower portion 210 are integrated into the shape of a bowl-shaped body with its bottom being cut off. The diameter of the internal space 220 of the outer rotary body 200 is largest at the annular upper end surface 230 at the uppermost position, and becomes smaller toward the lower side. Therefore, the inner inclined rotary body 300 can be freely housed in and taken out of the internal space 220 of the outer rotary body 200, which facilitates assembly and replacement of components. An inclined surface 232 is formed at the outer peripheral portion of the annular upper end surface 230 of the upper portion 215 (see FIG. 2B) to extend over the circumference. An inclination angle α of the inclined surface 232 is approximately 7°, for example, although the inclination angle α is illustrated as exaggerated in FIG. 2B.

As illustrated in FIG. 2C, the vertical line CL1 (dash-double-dot line in the drawing) corresponding to the rotational axis line of the upper portion 215 or the outer rotary body 200 is tilted by an angle β with respect to a plumb line (dot and dash line in the drawing) 201. The inclination angle β is approximately 3.5°, for example, and smaller than the inclination angle α discussed above in order not to impair the medicine piece transfer function, although the inclination angle β is illustrated as exaggerated in FIG. 2C. Therefore, the tilt of the inclined surface 232 with respect to the horizontal is varied between the maximum inclination (α+β) in the state of the inclined surface 232 on the left side in the drawing and the minimum inclination (α−β) in the state of the inclined surface 232 on the right side in the drawing along with rotation of the annular upper end surface 230. Since the inclination angle α of the inclined surface 232 is larger than the inclination angle β of the outer rotary body 200, the outer peripheral portion of the inclined surface 232 is always kept sloping downward with respect to the horizontal.

The direction of the inclination (angle β) of the vertical line CL1 is determined such that the height (vertical position) of the upper surface (medicine transfer path) of the annular upper end surface 230 of the outer rotary body 200 is higher on the side closer to the discharge port 14, although not illustrated. While the inclination (angle β) may be individually implemented by how to mount the outer rotary body 200 in the housing 11 of the medicine feeder 10, the inclination can also be implemented by inclining the upper surface of a shelf board etc. on which the housing 11 of the medicine feeder 10 is to be mounted by the angle β, for example, since the inclination (β) is small.

Figure 3A:
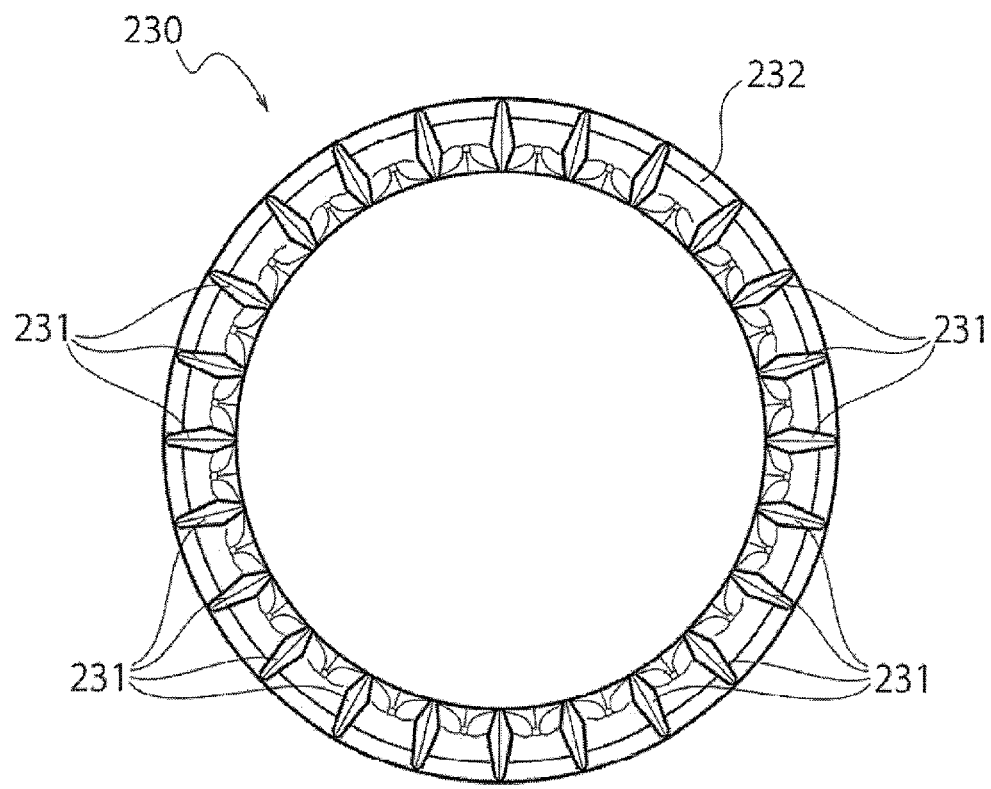
FIG. 3A is a plan view of an annular upper end surface of the outer rotary body.
Figure 3B:
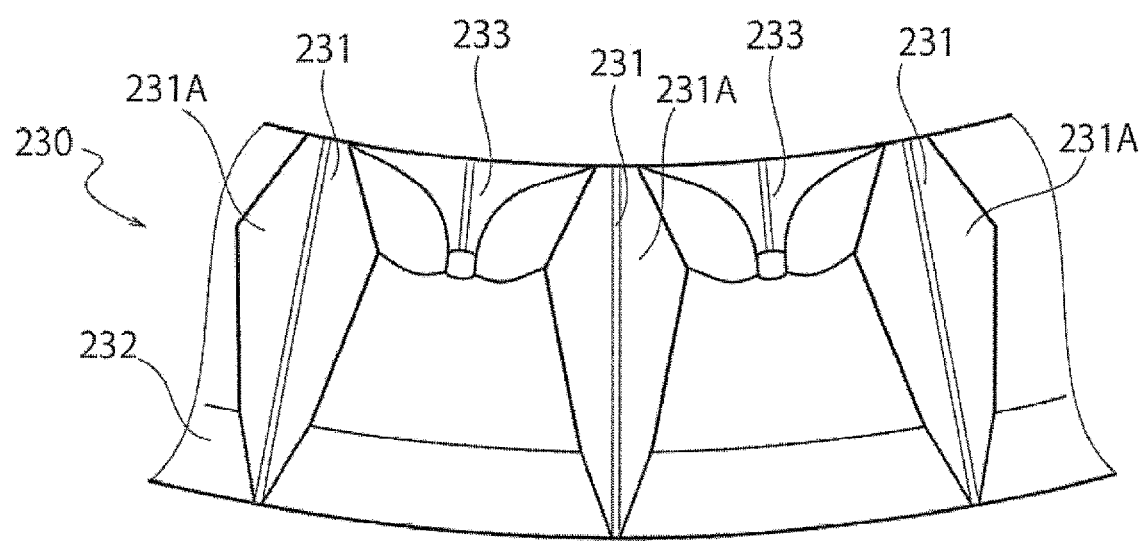
FIG. 3B is an enlarged view of a part of the outer rotary body.

As illustrated in FIGS. 3A and 3B or 3C and 3D, a large number of grooves 231 are formed on the annular upper end surface 230 (medicine transfer path) of the outer rotary body 200 at equal intervals in the circumferential direction. The grooves 231 are each formed as an engravement in a shape similar to a diamond shape or a spindle shape. Here, the longitudinal direction of the grooves 231 corresponds to the radial direction of the annular upper end surface 230 and the width of the grooves 231 is reduced at both ends in the radial direction. The width of the grooves 231 is increased at an intermediate portion in the radial direction, which forms a widened portion 231A. The medicine pieces tend to be stabilized at the widened portion 231A. As illustrated in FIG. 2B, a depth at the deepest portion of the grooves 231 is larger than a depth d of the inclined surface 232 discussed above. As illustrated in FIGS. 2B and 3A and 3B, end portions of the grooves 231 on the outer peripheral side reach the inclined surface 232, and thus the medicine pieces are smoothly moved from the grooves 231 to the inclined surface 232.

As illustrated in FIGS. 2B and 3A and 3B, a plurality of recessed portions 233 are also formed at the inner peripheral portion of the upper surface of the annular upper end surface 230. The engravements (recessed portions) 233 are each located between two adjacent grooves 231, 231. The engravements (or recessed portions) 233 are formed in a bay shape to become deeper toward the inner peripheral side and serve to quickly return easily rollable medicine pieces that have been brought closer to the inner peripheral side by the regulating mechanism 700 etc., rather than are accommodated in the grooves 231, from the medicine transfer path of the outer rotary body 200 onto the inner inclined rotary body 300 on the inner side. The recessed portions 233 may open radially inward at the inner peripheral edge.

The inner surfaces of the plurality of grooves 231, the inclined surface 232, and the inner surfaces of the recessed portions 233 are formed as smooth surfaces in order not to hinder movement of the medicine pieces. In FIGS. 3A and 3B, however, the surface of a portion of the annular upper end surface 230 excluding the plurality of grooves 231 and the inclined surface 232 is formed as a rough surface by being subjected to blasting etc. in order to prevent excessive sliding of the medicine pieces.

Figure 3C:
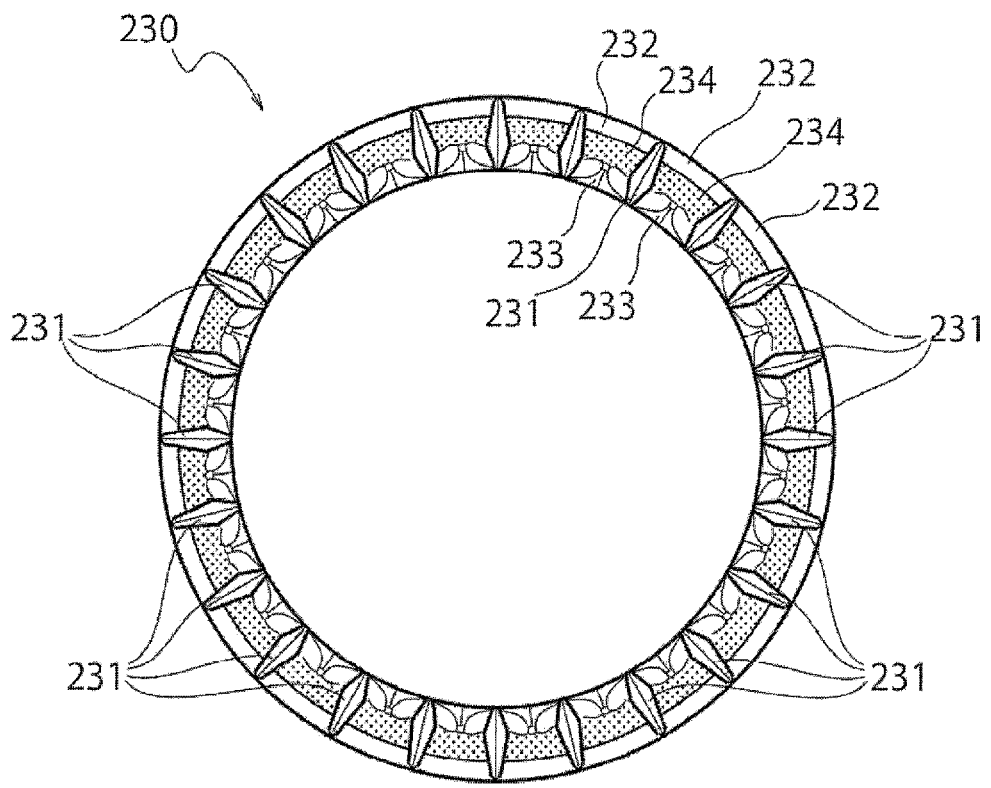
FIG. 3C is a plan view of an annular upper end surface of a different outer rotary body.
Figure 3D:
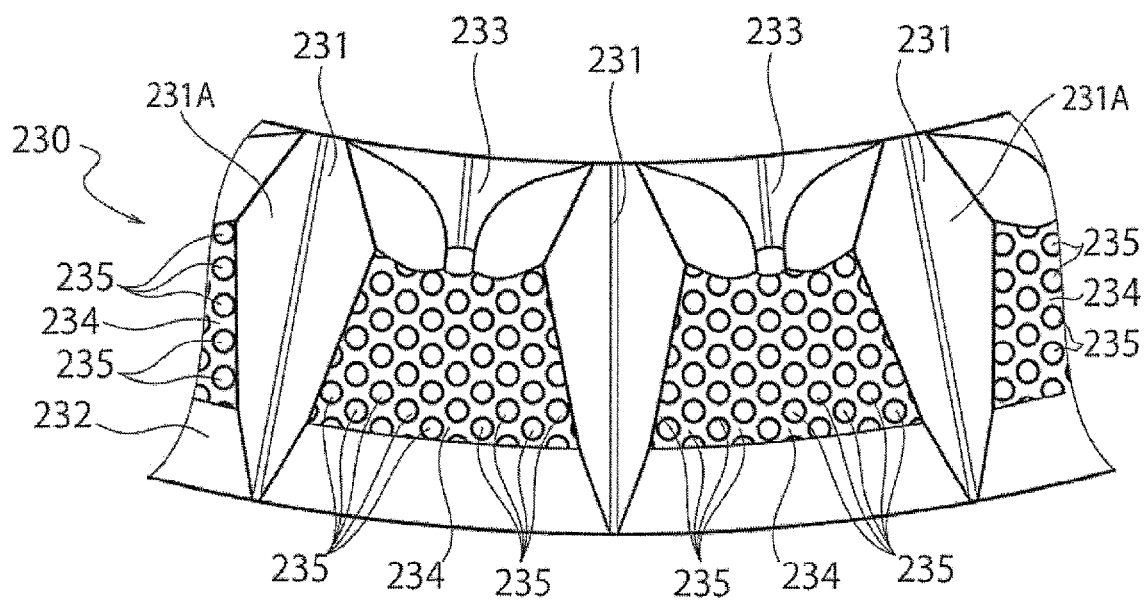
FIG. 3D is an enlarged view of a part of the different outer rotary body.

FIGS. 3C and 3D illustrate a structure for forming a rough surface through a process other than blasting, unlike the example in FIGS. 3A and 3B. In this example, an annular inclined surface 232 that slopes downward toward the radially outer side is formed over the circumference at the outer peripheral edge of the annular upper end surface 230 of the outer rotary body 200, and a bay-shaped recessed portion 233 is formed between two adjacent grooves 231, the recessed portion 233 becoming deeper toward the inner peripheral edge. In this example, a plurality of uneven portions (234, 235) are formed in all the regions surrounded by the two grooves 231, the recessed portions 233, and the annular inclined surface 232. In this example, a plurality of scattered points composed of bowl-shaped recesses 235 with a diameter of approximately 0.5 mm, which is sufficiently smaller than the diameter of the medicine pieces to be handled, are formed, A non-recessed portion (234) is formed by a planar portion surrounding the recesses 235. The plurality of recesses 235 are formed at substantially equal intervals, and are separated by the planar portion 234 and thus are not in close contact with each other, unlike the blasted surface. When the plurality of uneven portions (234, 235) are provided in a scattered point pattern, the medicine pieces are not easily slid, even when the outer rotary body 200 is rotated at a reduced speed or driven in reverse, because of the effect of the plurality of uneven portions in a scattered point pattern with high sliding resistance. Therefore, the speed of forward feed by the outer rotary body 200 can be increased. The plurality of recessed portions 235 may have any planar contour shape, and may have a rectangular shape or any other shape. The plurality of recessed portions 235 may be radially formed on concentric circles.

Figure 4A:
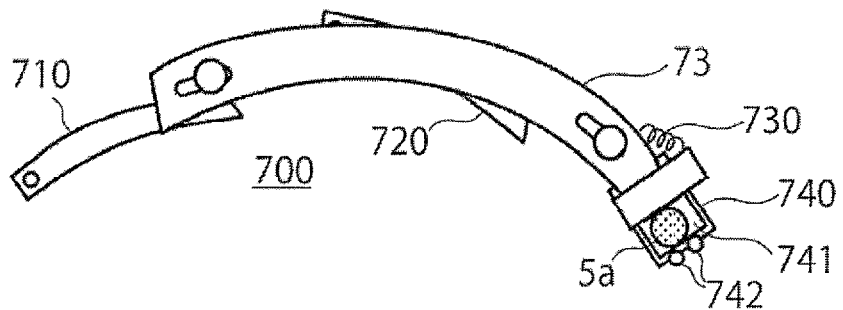
FIG. 4A is a plan view for a case where a large sample medicine piece is placed in a sample placement site.
Figure 4B:
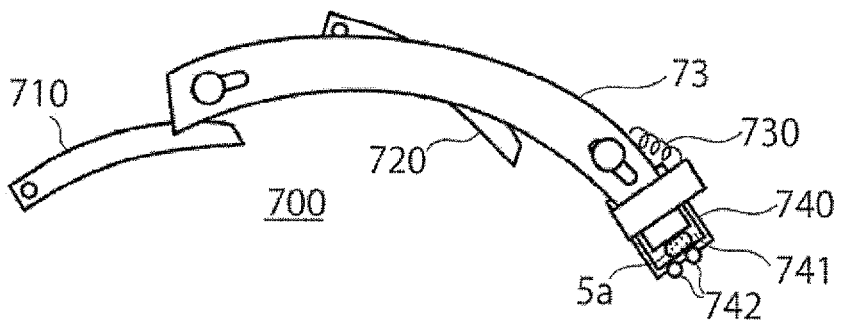
FIG. 4B is a plan view for a case where a small sample medicine piece is placed in the sample placement site, FIG. 4C includes a plan view, a front view, and a bottom view of a first or second regulating member.
Figure 4C:
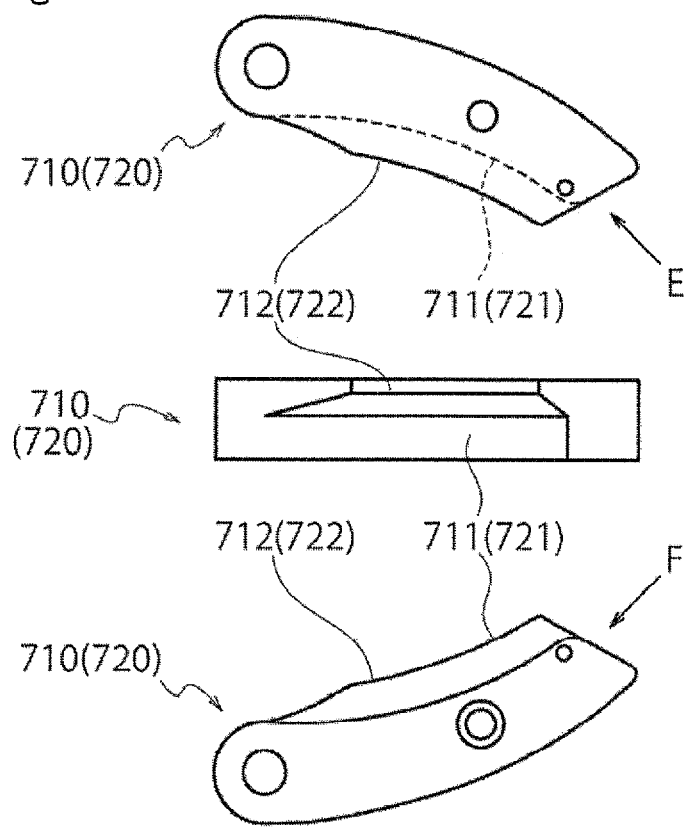
Figure 4D:
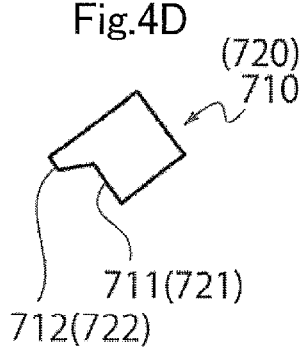
FIGS. 4D and 4E are each an end surface view.
Figure 4E:
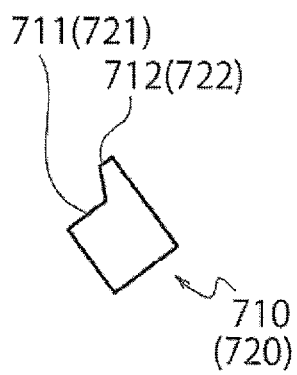

FIGS. 4A to 4E illustrate the regulating mechanism 700. FIG. 4A is a plan view of the regulating mechanism 700 in which a large sample medicine piece 5a is placed in a sample placement site 740. FIG. 4B is a plan view of the regulating mechanism 700 in which a small sample medicine piece 5a is placed in the sample placement site 740. FIG. 4C illustrates a component that is used as a first regulating member 710 and a second regulating member 720, wherein the upper view is a plan view of the component, the middle view is a front view of the component, and the lower view is a bottom view of the component. FIG. 4D illustrates an end surface of the component as seen in the direction of the arrow E indicated in FIG. 4C. FIG. 4E illustrates an end surface of the component as seen in the direction of the arrow F indicated in FIG. 4C. While the regulating mechanism 700 is similar to the regulating mechanism 70 according to the related art illustrated in FIGS. 9 and 10, an improvement has been made to the first regulating member 710, the second regulating member 720, and the sample placement site 740.

The first regulating member 710 will be discussed in detail, as the first regulating member 710 and the second regulating member 720 are of the same shape. The swing center portion of the first regulating member 710, which is at the left end in FIGS. 4A and 4B, is located on the housing 11 side, as with the first regulating member 71 discussed earlier. The swing end portion of the first regulating member 710, which is at the right end in FIGS. 4A and 4B, is located above the annular upper end surface 230 of the outer rotary body 200. The first regulating member 710 and the second regulating member 720 exhibit the lateral width regulation function to reduce the width of the medicine transfer path on the annular upper end surface 230 from the outer peripheral side according to advancement and retraction of the link mechanism 73 in the longitudinal direction (see FIGS. 4A and 4B).

The first regulating member 710 includes not only a lower level portion 711 that serves as a width regulating portion that assumes the lateral width regulation function, but also an upper level portion 712 that serves as a height regulating portion not provided in the first regulating member 71 discussed earlier. As illustrated in FIGS. 4D and 4E, the upper level portion 712 overhangs on the inner peripheral side compared to the lower level portion 711, and an inclined surface is provided between the upper level portion 712 and the lower level portion 711. Therefore, the upper level portion 712 of the first regulating member 710 moderately regulates the height, in addition to the lower level portion 711 providing a strict lateral width regulation function according to the state of the link mechanism 73. The second regulating member 720 is the same as the first regulating member.

In the regulating mechanism 700, as illustrated in FIG. 4A, the sample placement site 740 has been improved. A spring 730 operable to urge the link mechanism 73 toward the sample placement site 740 is further provided. When the distal end of the link mechanism 73 is rendered stationary in abutment with the sample medicine piece 5a, the lower level portion 711, 721 at the swing end portion of the first and second regulating members 710, 720 reduces the width of the medicine transfer path on the annular upper end surface 230 to such a width that allows one medicine piece to pass through the medicine transfer path. A small lid 741 and a setscrew 742 are provided at the sample placement site 740. The small lid 741 is an openable lid composed of a transparent member, and thus serves to prevent forgetting to place or take out the sample medicine piece 5a etc. The setscrew 742 is provided to fix the small lid 741 so that the small lid 741 that has been closed is not opened by the urging force of the spring 730. When such a lid 741 is provided, the lid 741 holds the sample medicine piece not to be lifted, even when a push-up force is applied to the sample medicine piece accommodated in the sample placement site 740 by causing the link mechanism 73 etc. for following the sample medicine piece to abut against the sample medicine piece, manually, by a spring force, etc. Therefore, it is possible to appropriately prevent the occurrence of an undesired event that the sample medicine piece jumps out of the sample placement site 740. When the lid 741 for the sample placement site 740 is transparent, it is possible to visually check if the sample medicine piece is not placed by mistake or is left by mistake.

Figure 5A:
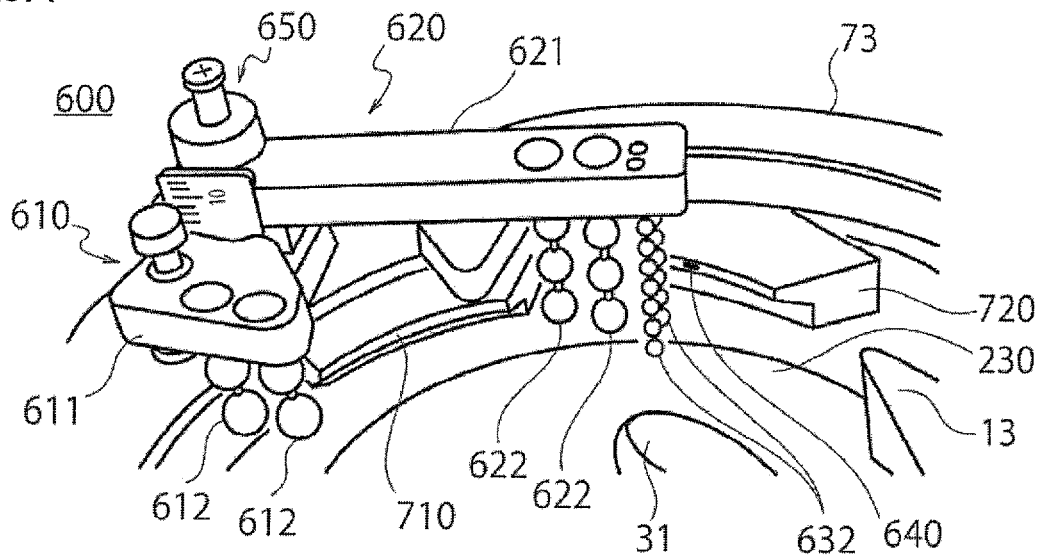
FIG. 5A is a perspective view of the sorting mechanism and a portion at which the sorting mechanism is installed.
Figure 5B:
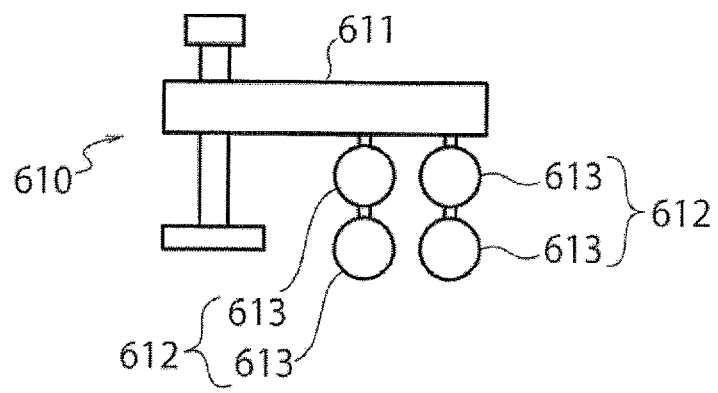
FIG. 5B is a front view of a first sorting member.
Figure 5C:
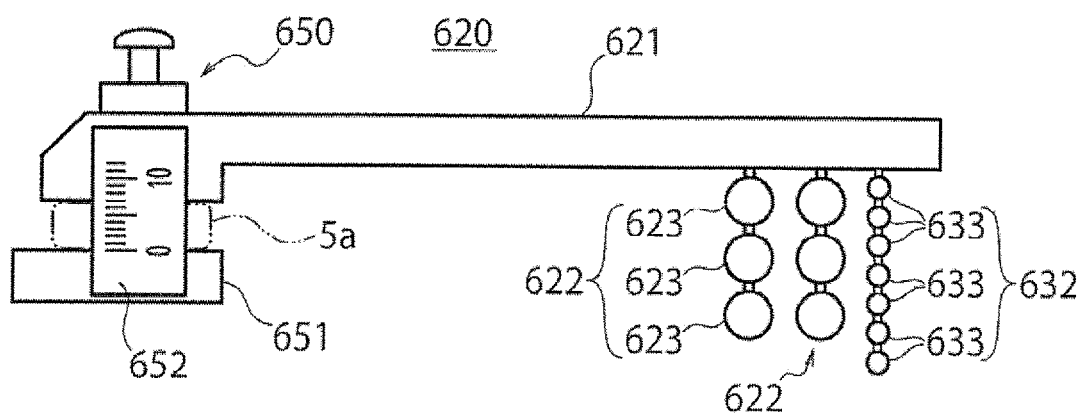
FIG. 5C is a front view of a second sorting member.

FIG. 5 illustrates the structure of the sorting mechanism 600 of the medicine feeder 100, wherein FIG. 5A is a perspective view illustrating the appearance of the sorting mechanism 600 and a portion at which the sorting mechanism 600 is installed, FIG. 5B is a front view of a first sorting member 610 of the sorting mechanism 600, and FIG. 5C is a front view of a second sorting member 620 of the sorting mechanism 600. The sorting mechanism 600 includes a first sorting member 610 disposed upstream of the regulating mechanism 700 in the medicine transfer path on the annular upper end surface 230 of the outer rotary body 200, and a second sorting member 620 disposed side by side with the regulating mechanism 700 in the medicine transfer path. The first sorting member 610 and the second sorting member 620 exhibit the function to sort medicine pieces at multiple stages.

The first sorting member 610 and the second sorting member 620 are mounted to the top plate 11A of the housing 11 which includes the discharge guide 13 and which supports the regulating mechanism 700. The first sorting member 610 (see FIGS. 5A and 5B) includes a short support member 611 located at a vertical position that is adjustable by a manual screw mechanism, and two front suspended objects 612 provided at a portion of the support member 611 close to the distal end so as to be ascended and descended together with the support member 611. The front suspended objects 612 (see FIG. 5B) are each a chain formed by loosely coupling a plurality of large balls 613 (two spherical bodies in the drawing), and can be implemented easily and inexpensively using a commercially available ball chain etc. In the first sorting member 610, the two front suspended objects 612 are suspended side by side from the support member 611 over the medicine transfer path on the annular upper end surface 230, and the vertical position of the front suspended objects 612 is normally adjusted such that the lower end of the front suspended objects 612 is slightly higher than the height of the medicine pieces. The second sorting member 620 (see FIGS. 5A and 5C) includes a long support member 621 located at a vertical position that is also manually adjustable, two middle suspended objects 622 and two rear suspended objects 632 attached to a portion of the support member 621 close to the distal end so as to be ascended and descended together with the support member 621, and a manual adjustment mechanism 650 operable to adjust the vertical position of the support member 621. The middle suspended objects 622 (see FIG. 5C) are each a chain formed by loosely coupling a plurality of medium balls 623 (three spherical bodies in the drawing). The number of the medium balls 623 coupled is larger than that of the large balls 613, as the medium balls 623 are smaller than the large balls 613. The two rear suspended objects 632 are each a chain formed by loosely coupling a plurality of small balls 633 (seven on the front side and six on the back side in the drawing). The number of the small balls 633 coupled is larger than that of the medium balls 623, as the small balls 633 are further smaller than the medium balls 623.

The manual adjustment mechanism 650 is set by raising the support member 621 through a manual operation to increase the gap between the support member 621 and a lower limit setting mechanism 651, placing a sample medicine piece 5a (a medicine piece 5 that is separate from but is in the same shape as the sample medicine piece 5a placed in the sample placement site 740 discussed above) on the lower limit setting mechanism 651, and then lowering the support member 621 through a manual operation until the support member 621 lightly contacts the sample medicine piece 5a. As a result of this operation, the support member 621 is brought to a vertical position corresponding to the sample medicine piece 5a.

As illustrated in FIG. 5C, the lower limit setting mechanism 651 is provided with a scale member 652. The scale on the scale member 652 indicates the gap between the lower limit setting mechanism 651 and the support member 621 and the size of the sample medicine piece 5a, and also indicates the height of regulation by the second sorting member 620 adjusted by the manual adjustment mechanism 650. The scale also guides adjustment of the first sorting member 610, since the size of the sample medicine piece 5a is measured and indicated along with adjustment of the vertical position of the support member 621.

Next, the positional relationship among the front suspended objects 612, the middle suspended objects 622, and the rear suspended objects 632 discussed above, and the roles of the suspended objects 612, 622, and 632 play, etc. will be described. The two front suspended objects 612 are suspended over the medicine transfer path on the annular upper end surface 230, and arranged side by side in the direction intersecting the medicine transfer path which extends in the diametrical direction of the annular upper end surface 230. The lower end position of the front suspended objects 612 depends on the adjustment policy, and thus cannot be determined unconditionally. In most cases, however, the lower end position of the front suspended objects 612 is set to be slightly higher than the medicine pieces so that, if the medicine pieces are stacked on the medicine transfer path, the front suspended objects 612 interfere with the upper medicine piece. While the front suspended objects 612 include the large balls 613 which are heavy and efficiently resolve stacking of the medicine pieces, the impact applied to the medicine pieces is small since the large balls 613 at the free lower end can escape because of deformation of coupling portions directly above the large balls 613.

When the medicine pieces are spherical in shape, the medicine pieces are often easily rollable and are not stable in position. When the spherical medicine pieces are located at the middle in the direction intersecting the medicine transfer path, the medicine pieces slip between the front suspended objects 612 arranged side by side. When the medicine pieces are located slightly to a side with respect to the middle of the medicine transfer path, the front suspended object 612 located on the side of the displacement lightly interfere with the medicine pieces to bring the medicine pieces closer to the middle (to the widened portions 231A of the grooves 231 on the annular upper end surface 230 of the outer rotary body 200 discussed above when the medicine pieces are easily rollable). On the contrary, when the medicine pieces are significantly displaced from the middle of the medicine transfer path, many of the medicine pieces are pushed out from the top of the annular upper end surface 230 to be returned onto the inner inclined rotary body 300, although some of the medicine pieces are brought closer to the middle of the medicine transfer path, depending on how the medicine pieces are contacted.

The two middle suspended objects 622 are straddling sorting members with the support member 621 straddling the regulating mechanism 700. The middle suspended objects 622 are also suspended over the medicine transfer path on the annular upper end surface 230, and located at a side of the regulating mechanism 700 (the second regulating member 720, in particular) as laterally arranged suspended objects.

The two middle suspended objects 622 are located above the medicine transfer path on the annular upper end surface 230, and arranged obliquely with respect to the medicine transfer path. When the relationship between the support member 621 and the manual adjustment mechanism 650 is the standard setting, the lower end position of the two middle suspended objects 622 is slightly lower than the medicine pieces on the medicine transfer path. Therefore, when the medicine pieces are stacked on the medicine transfer path, the two middle suspended objects 622 resolve stacking of the medicine pieces with the medium balls 623 interfering with the upper medicine piece. The two middle suspended objects 622 also exhibit the function to align the medicine pieces on the medicine transfer path by returning medicine pieces, for example, in a single, isolated state or located obliquely and placed on the inner peripheral side of the medicine transfer path to the middle of the medicine transfer path or to the inner inclined rotary body 300.

The two rear suspended objects 632 (see FIG. 5A) are arranged side by side in the direction intersecting the medicine transfer path with one (the one with six balls on the back side in the drawing) of the rear suspended objects 632 being suspended over the inner peripheral side of the medicine transfer path on the annular upper end surface 230 and with the other (the one with seven balls on the front side in the drawing) being suspended over the outer peripheral side of the inner inclined rotary body 300. The two rear suspended objects 632 are lined up in a direction of crossing the medicine transfer path on the annular upper end surface 230. According to the adjustment of the height of the support member 621 by the manual adjustment mechanism 650, the lower end position of one of the rear suspended objects 632 is set to be slightly lower than the lower end position of the middle suspended objects 622 discussed above, and the lower end position of the other rear suspended object 632 is set to be still lower. Therefore, the order of the respective lower end positions of the first sorting member 610 with the large balls 613, the middle suspended objects 622 with the medium balls 623, and the rear suspended objects 632 with the small balls 633 coincides with the order of the respective dimensions of the balls.

As illustrated in FIG. 5A, at least the rear suspended object 632 on the inner peripheral side (the one with seven balls on the front side in the drawing), of the two rear suspended objects 632, adopts a magnetic substance such as iron as the material of the small balls 633. An attracting member 640 constituted of a permanent magnet etc. is attached, by fitting-in etc., at a portion of the second regulating member 720 close to the rear suspended objects 632. With this configuration, the rear suspended objects 632 apply a gentle but effective reaction force to the medicine pieces which abut against the rear suspended objects 632 from the top of the medicine transfer path, with the attracting force of the attracting member 640 added to a component force of the gravity. Consequently, medicine pieces located away from the second regulating member 720 are brought closer to the second regulating member 720, which enhances the function of the second regulating member 720. Such rear suspended objects 632 place a higher value on enhancing the regulation of the lateral width of the medicine pieces by the second regulating member 720 than the function of the rear suspended objects 632 themselves to regulate the height of the medicine pieces.

Figure 6A:
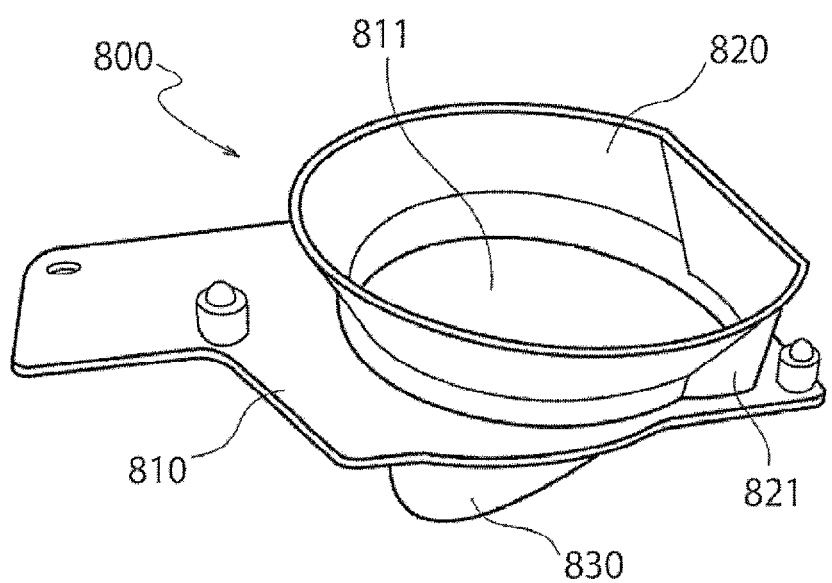
FIG. 6A is a perspective view.
Figure 6B:
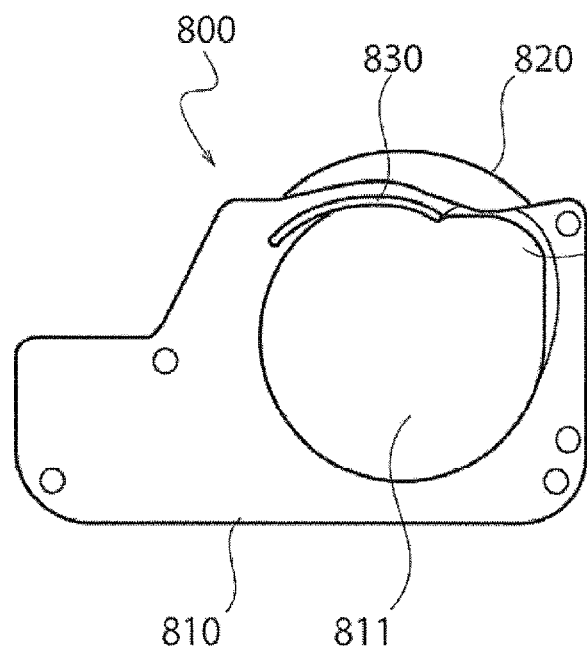
FIG. 6B is a bottom view.
Figure 6C:
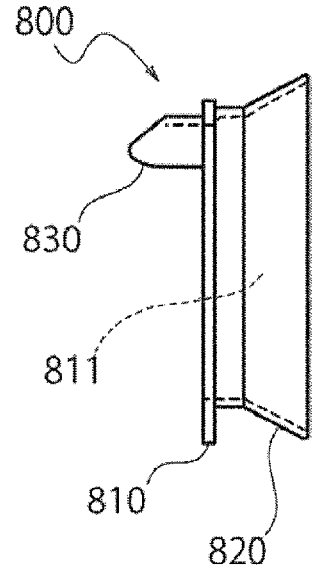
FIG. 6C is a side view.

An internal space expansion member 800 illustrated in FIG. 6 is mounted on top of the peripheral wall of the housing 11 to expand the internal space 200 of the outer rotary body 200 upward. FIGS. 6A to 6C illustrate the structure of the internal space expansion member 800 of the medicine feeder 100, wherein FIG. 6A is a perspective view, FIG. 6B is a bottom view, and FIG. 6 is a side view. The internal space expansion member 800 includes a flange portion 810 having a through hole 811 corresponding to the opening portion of the internal space 220 of the outer rotary body 200 and fixed to the top plate 11A located on the peripheral wall 11C of the housing 11, and a tubular portion 820 rising from the peripheral edge portion of the through hole 811 and extending upward from the flange portion 810 to extend the internal space 220 upward. The internal space expansion member 800 further includes a suspended portion 830 extending into the internal space 220 of the outer rotary body 200. When the flange portion 810 is fixed to the top plate 11A located at the upper end portion of the peripheral wall 11C of the housing 11, the suspended portion 830 extends into the internal space 220 with the suspended portion 830 being located at a side of the regulating mechanism 700 not to interfere with the regulating mechanism 700, the inner inclined rotary body 300, or the outer rotary body 200.

The flange portion 810 is removably mountable on top of the top plate 11A, either directly or indirectly via a plate body on which the discharge guide 13 is formed. When the flange portion 810 is mounted on the top plate 11A, the through hole 811 is located above the outer rotary body 200 and the inner inclined rotary body 300, and the tubular portion 820 projects upward while being slightly expanded to extend the through hole 811 upward, which increases the amount of medicine pieces to be accommodated. When the flange portion 810 is mounted to the top plate 11A, the suspended portion 830 is inserted into the outer rotary body 200 (at least into the opening portion of the annular upper end surface 230) to be located at a side of and close to the regulating mechanism 700 (the first regulating member 710 and the second regulating member 720, in particular). This construction prevents medicine pieces in the tubular portion 820 from rolling onto the regulating mechanism 700 and a portion of the annular upper end surface 230 around the regulating mechanism 700. The suspended portion 830 also allows medicine pieces moved off from the top of the annular upper end surface 230 before the discharge guide 13 to smoothly return onto the inner inclined rotary body 300.

In the present embodiment, a swell 812 is formed in a part of the through hole 811 (see FIG. 6B), and a swell 821 is also formed at the corresponding portion of the tubular portion 820 to range from the swell 812 (see FIG. 6A). The swells 812 and 821 avoid undesired interference with the inner inclined rotary body 300, and allow the medicine pieces to be smoothly delivered from the inner inclined rotary body 300 to the outer rotary body 200.

Figure 7A:
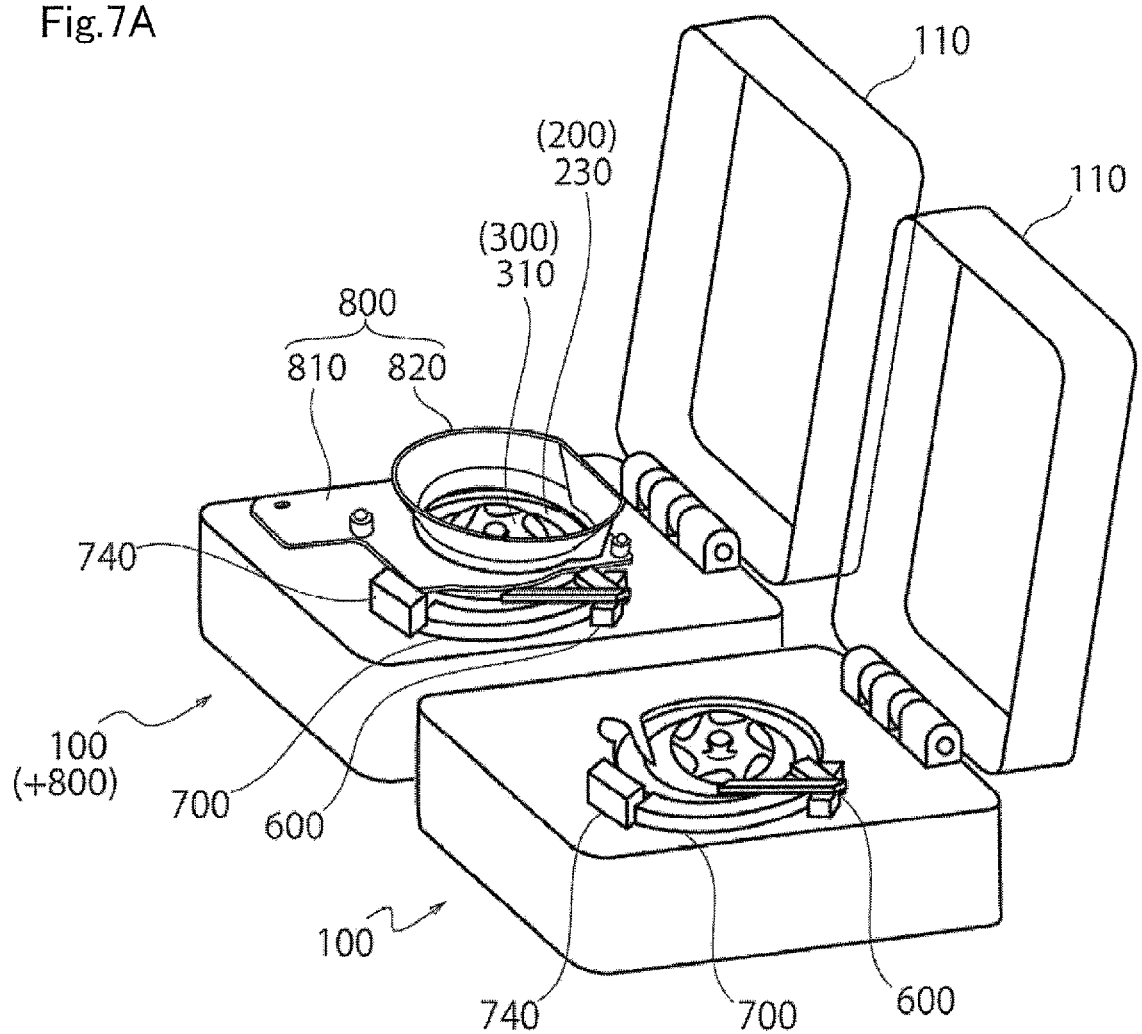
FIG. 7A is a perspective view illustrating the appearance with large lids being opened and FIG. 7B is a perspective view illustrating the appearance with the large lids being closed.
Figure 7B:
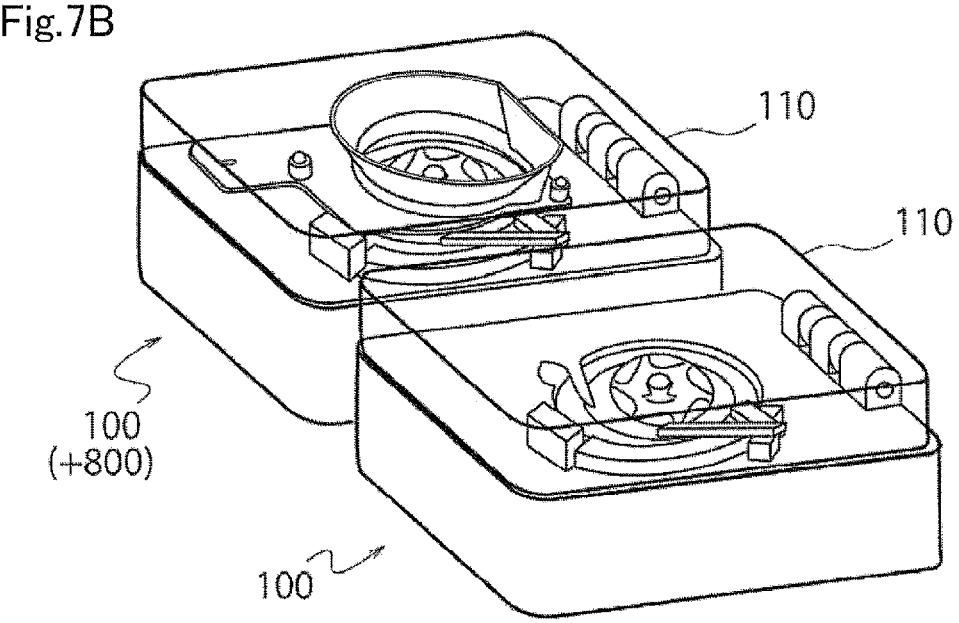

FIGS. 7A and 7B illustrate the overall structure of two medicine feeders 100, 100 arranged side by side, one with the internal space expansion member 800 and the other without, wherein FIG. 7A is a perspective view illustrating the appearance of the medicine feeders 100 with covers 110 being opened and FIG. 7B is a perspective view illustrating the appearance of the medicine feeders 100 with the covers 110 being closed. The covers 110 are each coupled via a hinge member to the top plate 11A of the housing 11 or the upper surface of a plate body that forms the discharge guide 13 etc., and covers and opens a space above the top plate 11A. The hinge member includes a bistable spring etc. so that the cover 110 is stable in either of a fully opened state and a fully closed state. The cover 110 is constituted of a transparent or translucent member so that the operating status of the inner inclined rotary body 300 etc. can be visually checked even when the space above the top plate 11A is covered.

In the medicine feeder 100 on which the cover 110 and the internal space expansion member 800 are mounted, the depth of the cover 110 and the height of the internal space expansion member 800 are determined in association with each other such that the lower surface of the cover 110 approaches the upper end of the tubular portion 820 of the internal space expansion member 800 to almost contact the upper end of the tubular portion 820 when the cover 110 is closed. As a result, the upper end opening of the tubular portion 820 of the internal space expansion member 800 is closed by the lower surface of the cover 110 to block passage of the medicine pieces when the cover 110 is closed.

If the hinge member is provided on the rear side (on the right rear side in the drawing) of the medicine feeder 100 as illustrated in the drawing so that the medicine feeder 100 is closed when the cover 110 is lowered toward the front side and the medicine feeder 100 is opened when the cover 110 is raised toward the rear side, a plurality of medicine feeders 100 are easy to use when the medicine feeders 100 are arranged side by side. As a matter of course, however, a plurality of covers 110 may be opened in different directions.

Figure 8A:
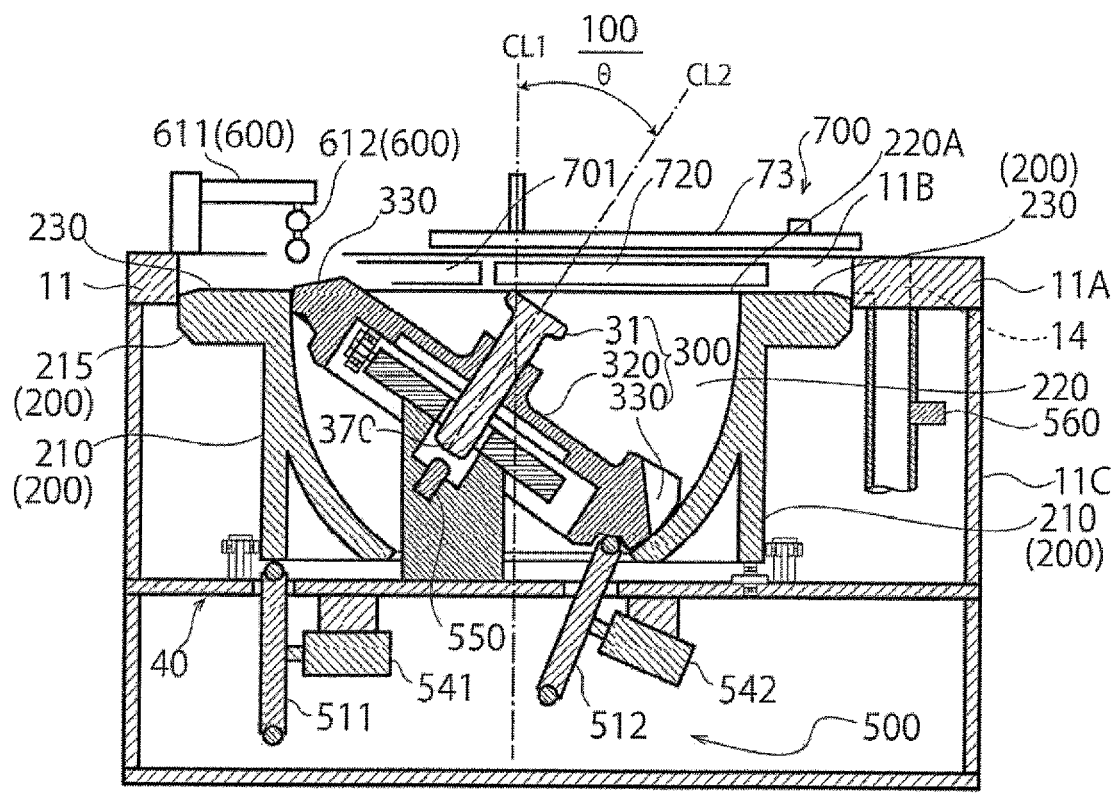
FIG. 8A illustrates the mechanical structure inside the medicine feeder.
Figure 8B:
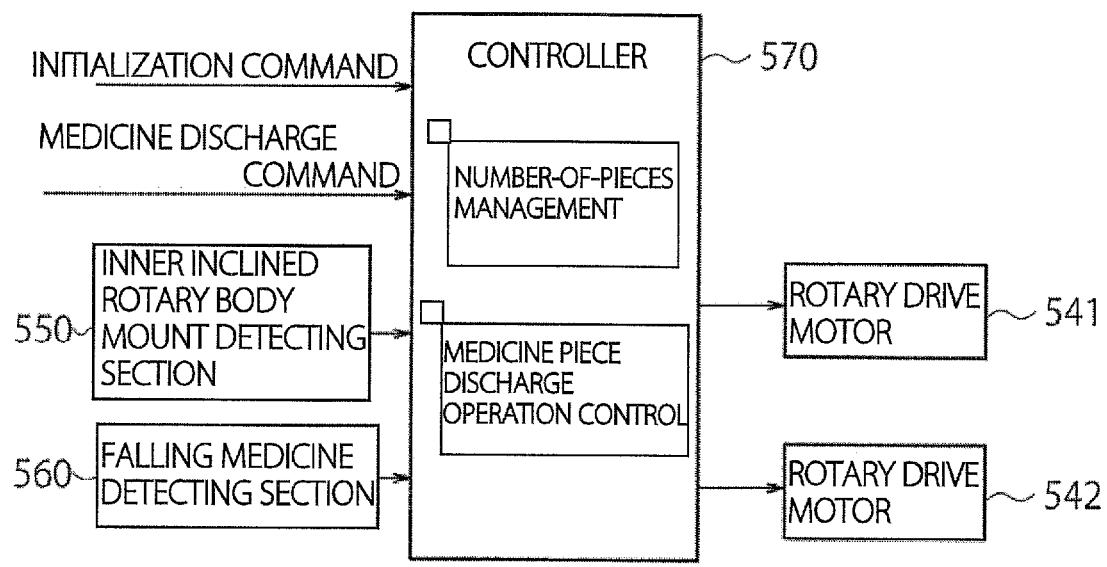
FIG. 8B is a block diagram of a control portion.
Figure 9A:
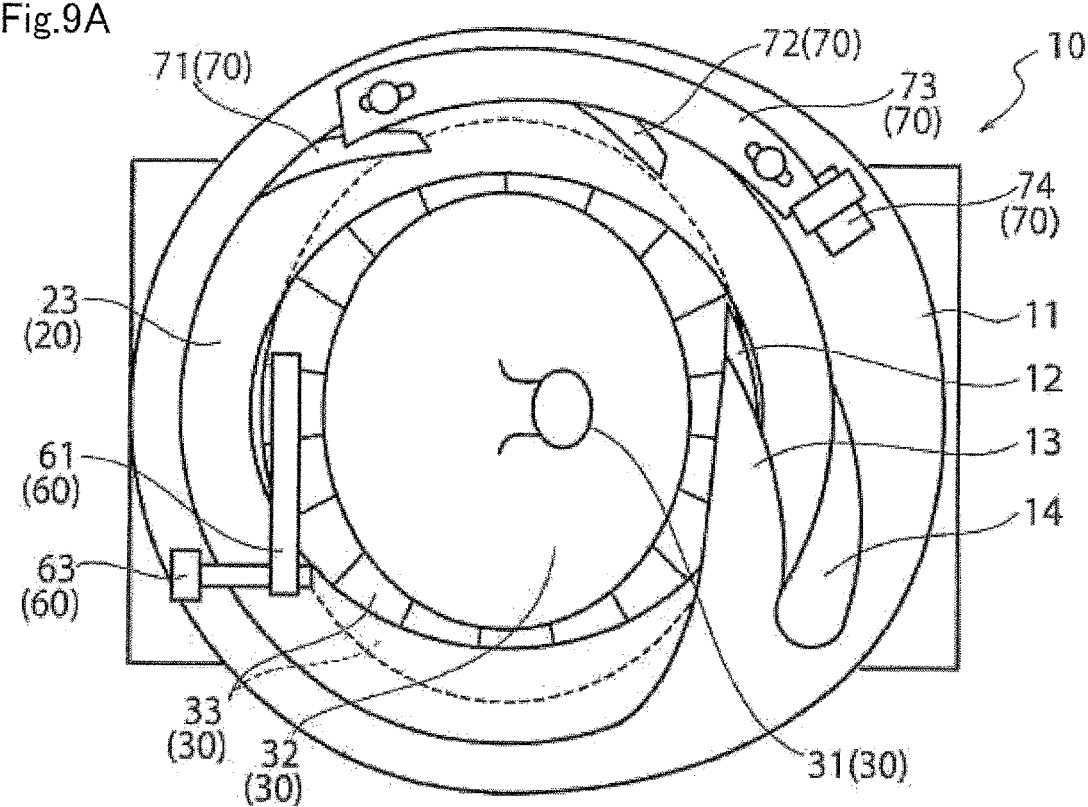
FIG. 9A is a plan view and FIG. 9B is a vertical sectional front view.
Figure 9B:
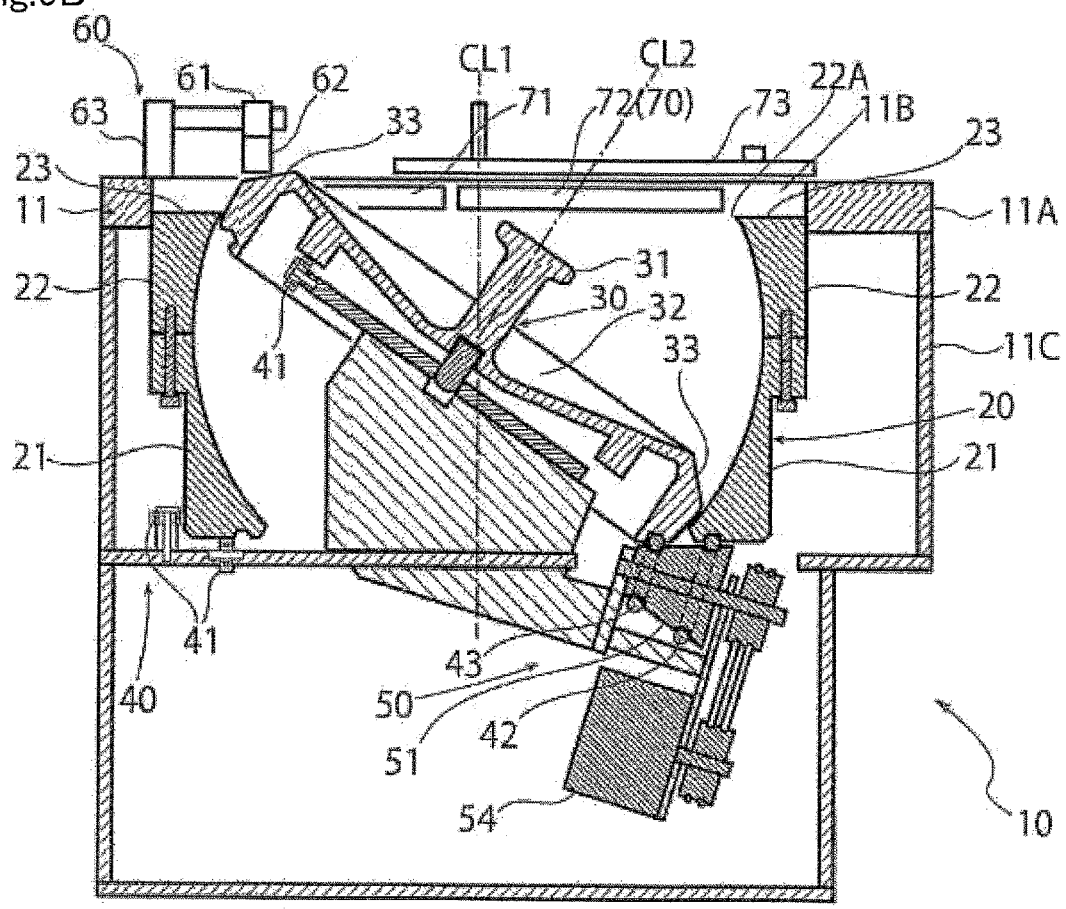
Figure 10A:
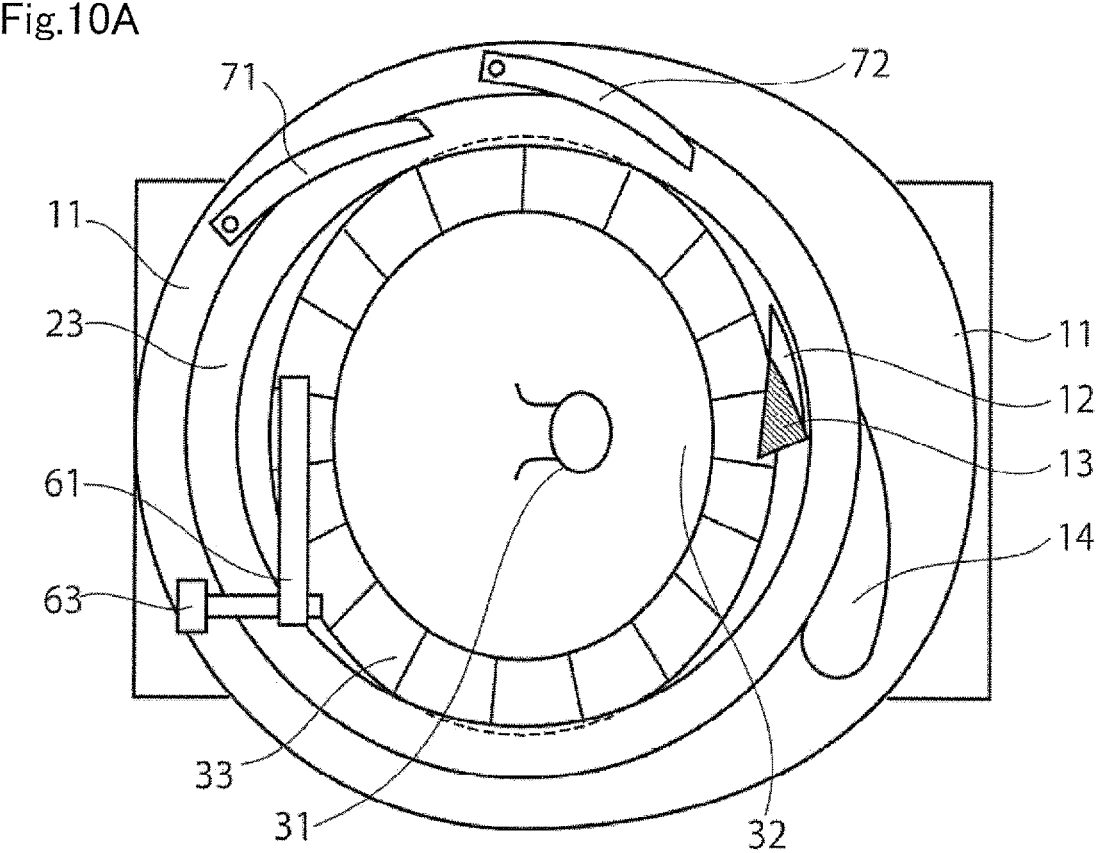
FIG. 10A is a plan view illustrating the medicine feeder with a link mechanism and an upper layer portion of a peripheral wall being removed and FIG. 10B is a plan view with the peripheral wall being also removed.
Figure 10B:
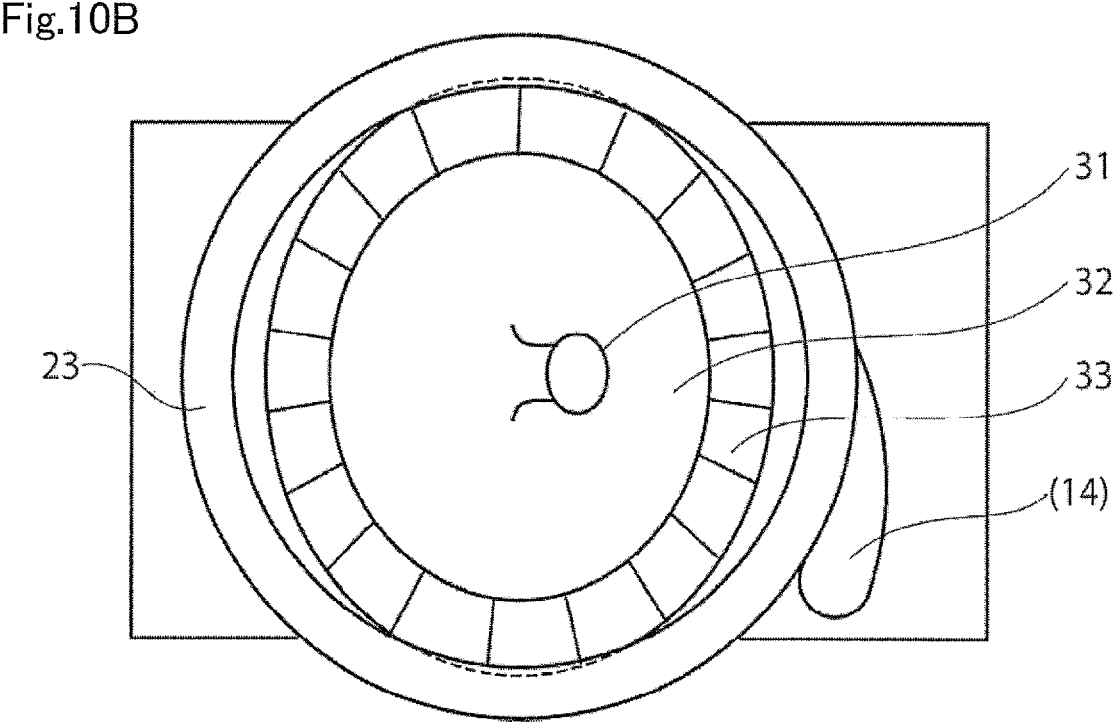
Figure 11A:
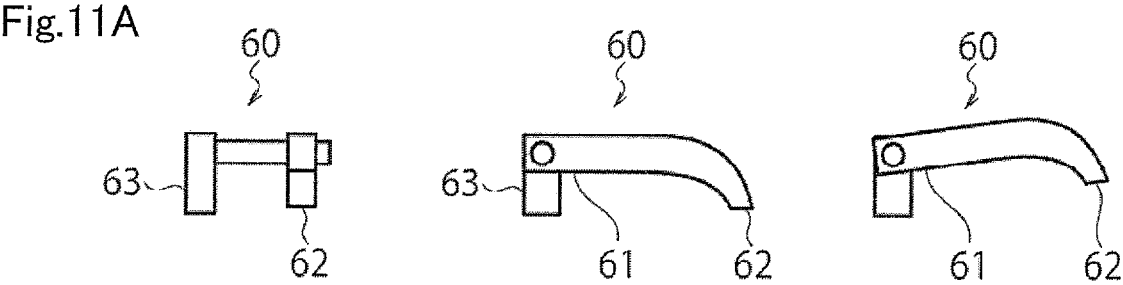
FIG. 11 illustrates the medicine feeder according to the related art, wherein FIG. 11A includes a front view, a right side view, and a left side view of a support member
FIG. 11B is an exploded view of an essential portion of the feeder, illustrating a vertical section of the peripheral wall etc. and a rotary container and the appearance of a rotary drive mechanism and rotation transmission members.
Figure 11B:
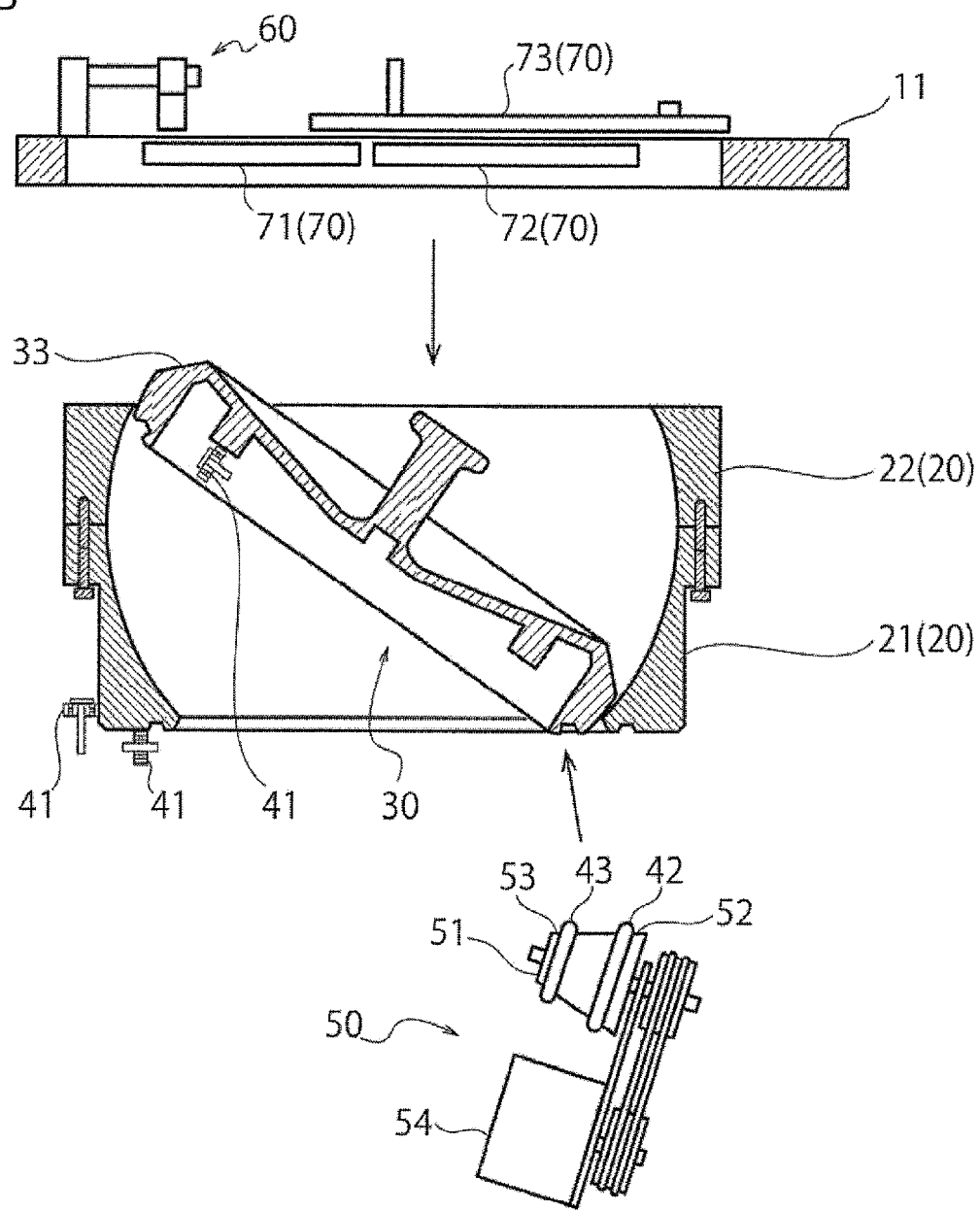
Figure 12A:
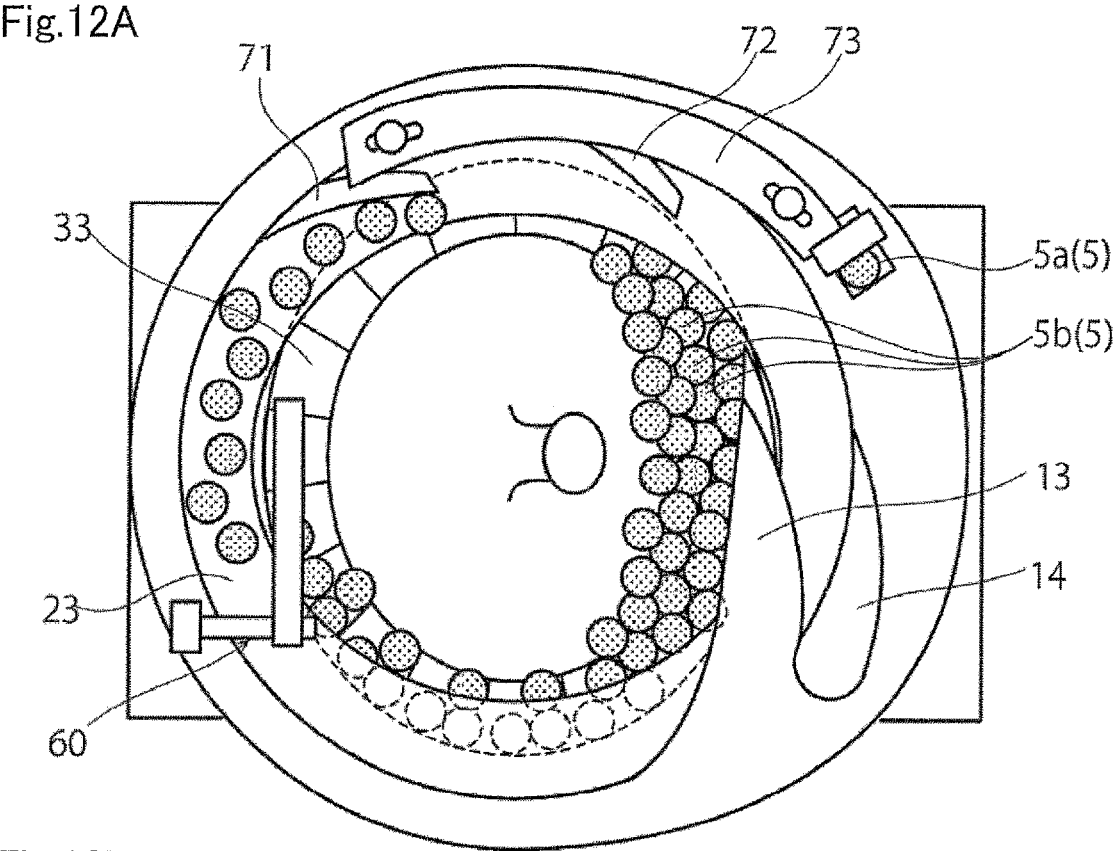
FIG. 12A is a plan view and FIG. 12B is a vertical sectional front view.
Figure 12B:
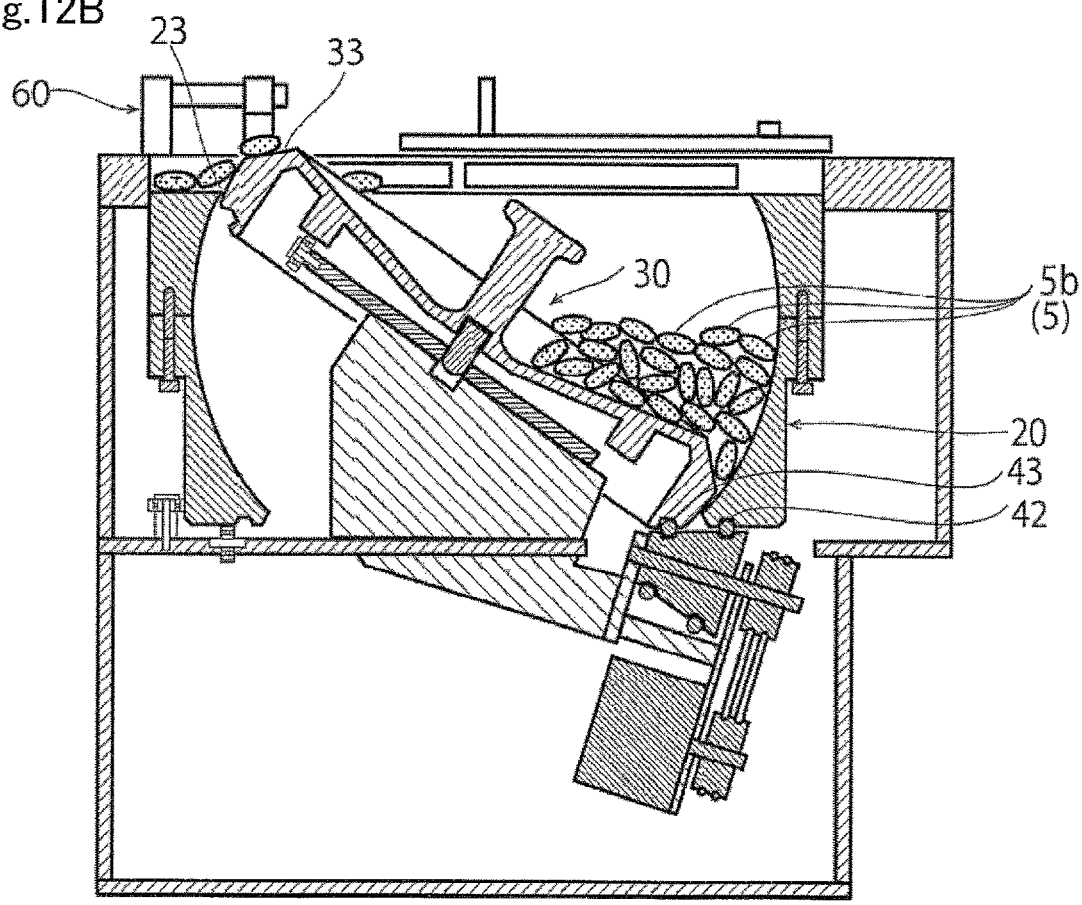
Figure 13A:
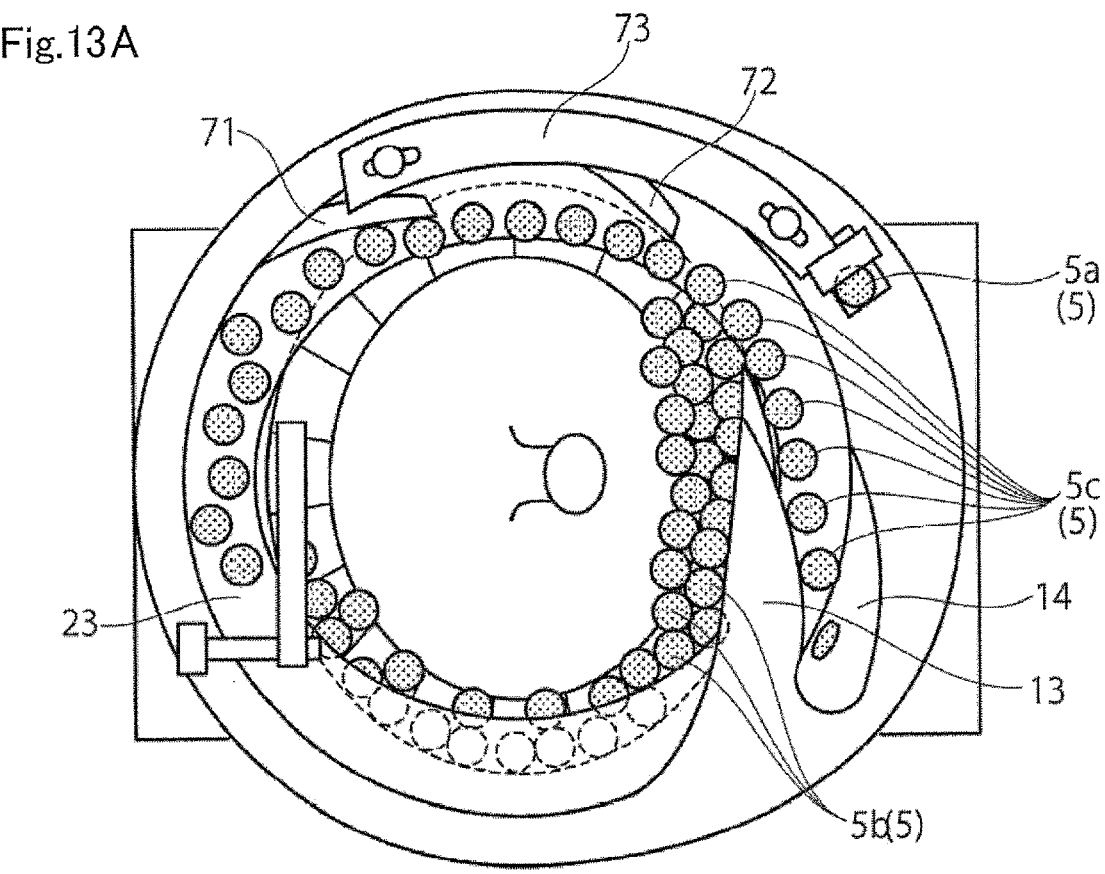
FIG. 13A is a plan view and FIG. 13B is a vertical sectional front view.
Figure 13B:
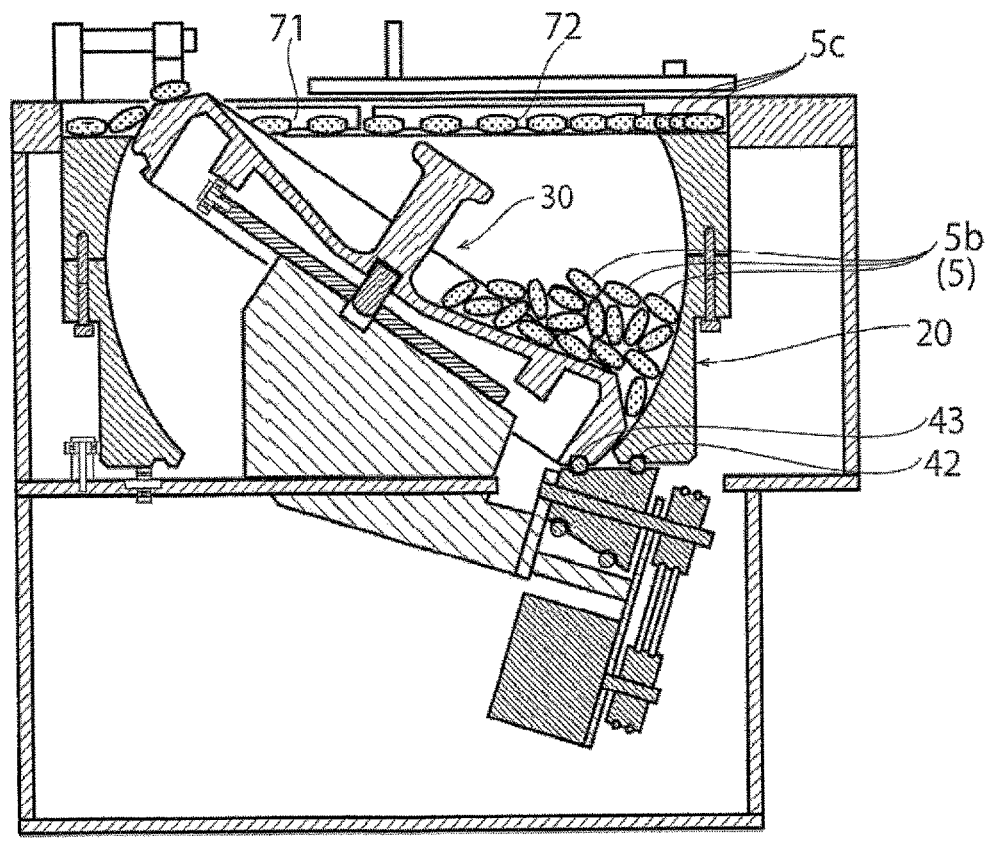

FIG. 8A illustrates the internal structure of the medicine feeder 100 with the built-in rotary drive mechanism 500. FIG. 8B is a block diagram of a controller 570 etc. (control portion) for rotary drive control. The rotary drive mechanism 500 illustrated in FIG. 8A includes a rotary drive member 511 and a rotary drive member 512 that replace the rotary drive member 51 illustrated in FIG. 11, a rotary drive motor 541 and a rotary drive motor 542 that replace the rotary drive motor 54 illustrated in FIG. 11, an inner inclined rotary body mount detecting section 550 newly added, and a falling medicine detecting section 560 clearly indicated with a reference numeral. The rotary drive motor 541 rotates the outer rotary body 200 via the rotary drive member 511. The rotary drive motor 542 rotates the inner inclined rotary body 300 via the rotary drive member 512. In the present embodiment, the drive system is divided into two systems, which allows the outer rotary body 200 and the inner inclined rotary body 300 to be independently driven. A motor, the rotational direction of which is selectively switchable between forward and reverse according to control by the controller 570, is adopted for both the rotary drive motor 541 and the rotary drive motor 542. Therefore, the rotary drive mechanism 500 can individually reverse the rotational direction of the outer rotary body 200 and the rotational direction of the inclined rotary body 300.

The inner inclined rotary body mount detecting section 550 is constituted from a photosensor etc. attached to a journal portion etc. for a rotary shaft portion 370 of the inner inclined rotary body 300. While the rotary shaft portion 370 is located at the location to be detected by the photosensor when the inner inclined rotary body 300 is appropriately mounted, the rotary shaft portion 370 is located off the location to be detected by the photosensor when the inner inclined rotary body 300 is removed or mounted in an inappropriate state. As a result, it is possible to detect whether the inner inclined rotary body 300 is mounted or removed.

The falling medicine detecting section 560 is constituted from a photosensor etc. that faces a medicine falling path that extends downward from the discharge port 14, and detects the falling state of medicine pieces that have been aligned on the annular upper end surface 230 of the outer rotary body 200 and that have been consecutively discharged through the falling path.

The controller 570 is a control circuit (control section) mainly constituted of a microprocessor, and controls rotation of the set of rotary drive motors 541 and 542 that can be independently driven in response to various commands such as an initialization command and a medicine discharge command from an operation section or a higher-level device (not illustrated). The controller 570 includes a medicine discharge operation control program (medicine discharge operation control section) for consecutively discharging medicine pieces while adjusting the rotational direction and the rotational speed of the rotary drive motor 541 and the rotational direction and the rotational speed of the rotary drive motor 542 with reference to the presence or absence of an initialization command and the result of detection by the falling medicine detecting section 560, and a number-of-pieces management program (number-of-pieces management section) for discharging a number of medicine pieces, the number being specified by the medicine discharge command.

In the control performed using the number-of-pieces management program, an estimated value of the medicine size is cleared immediately after the medicine feeder 100 is removed or mounted or power for the medicine feeder 100 is turned on, upon receiving an operation to replenish the medicine feeder 100 with medicine pieces or to reset the medicine feeder 100, or upon receiving an initialization command to be issued after a medicine discharge time-out etc. In addition, it is determined whether or not the inner inclined rotary body 300 and hence the outer rotary body 200 are appropriately mounted by monitoring the result of detection by the inner inclined rotary body mount detecting section 550, and the next number-of-pieces management process is performed only when such rotary bodies are appropriately mounted. That is, in the number-of-pieces management process, the medicine discharge operation control program is started, then the number of medicine pieces to be discharged is grasped by monitoring the result of detection by the falling medicine detecting section 560, and operation of the medicine discharge operation control program is stopped when a number of medicine pieces are discharged. Here, the number is specified by the medicine discharge command.

In the control performed using the medicine discharge operation control program, initial operation performed before an estimated value of the medicine size is obtained is performed when an estimated value of the medicine size has been checked and cleared as discussed above. In the initial operation, the rotational speed of the rotary container (200, 300) which includes the outer rotary body 200 and the inner inclined rotary body 300 is first set to high speed, and then switched to low speed. The preceding high-speed rotation is performed for a time assumed for the first medicine piece to ride onto the outer rotary body 200 from the inner inclined rotary body 300 in the medicine feeder 100 in the initial state, e.g. for about a time in which the inner inclined rotary body 300 makes one-fourth rotation. The next low-speed rotation is performed at such low speed that even easily rollable medicine pieces do not gain momentum to unnecessarily fall into the discharge port 14 until the first falling medicine piece is detected by the falling medicine detecting section 560. In this manner, it is possible to shorten the required time while avoiding discharge of excessive medicine pieces even when the size of the medicine pieces is not known.

In the control performed using the medicine discharge operation control program, the number-of-pieces management program is notified that one medicine piece has been discharged each time falling of a medicine piece is detected by the falling medicine detecting section 560. An estimated value of the medicine size is also set during initial operation in which an estimated value of the medicine size has been cleared. Specifically, the medicine detection time length is measured when the first falling medicine piece is detected, and the measured value as it is or a value obtained by multiplying the measured value by a predetermined constant is adopted as an estimated value of the medicine size. Initial operation is completed in this manner.

Steady operation is performed in the control performed using the medicine discharge operation control program after an estimated value is set or when an estimated value has already been set. In the steady operation, the rotational speed of the rotary container (200, 300) is variably controlled in correspondence with the estimated value of the medicine size. Specifically, feedback control is performed using the inverse of the estimated value described above as it is or a value obtained, for example, by multiplying the inverse by a constant as a control target value for the rotary container (200, 300). When a command to stop operation is issued from the number-of-pieces management program, the medicine discharge operation control program performs control so as to gradually decrease rotation of the rotary container (200, 300) or rotate the rotary container (200, 300) in reverse to prevent falling of excessive medicine pieces, rather than abruptly stopping rotation of the rotary container (200, 300), in order to prevent falling of excessive medicine pieces.

The rotary container is rotated in reverse when a number of medicine pieces have been discharged, the number being specified by the medicine discharge command. Therefore, for example, when the medicine discharge command is issued from a medicine dispensing apparatus as a higher-level device, reverse discharge operation is performed for one packet at a time, so to speak.

While the rotary container (200, 300) may be rotated in reverse by rotating both the outer rotary body 200 and the inner inclined rotary body 300 in reverse, the outer rotary body 200 is continuously rotated forward and only the inner inclined rotary body 300 is slightly rotated in reverse in this embodiment.

The mode of use and operation of the medicine feeder 100 according to the embodiment will be described with reference to the drawings. The features of the medicine feeder 10 that follow those discussed already will be discussed only briefly, and improvements and new features will be mainly discussed in detail below. First, when the inner inclined rotary body 300 is not appropriately mounted with the outer rotary body 200 being appropriately mounted, the inner inclined rotary body mount detecting section 550 cannot detect the rotary shaft portion 370 of the inner inclined rotary body 300, and accordingly issues an alarm. When the alarm is noticed, the outer rotary body 200 and the inner inclined rotary body 300 are set again.

In order to consecutively feed a large number of medicine pieces 5 using the medicine feeder 100, the cover 110 is opened (see FIG. 7A). When the amount of medicine pieces 5 does not exceed the capacity of the rotary container, it is not necessary to mount the internal space expansion member 800 (see the medicine feeder 100 on the front right side in FIG. 7A). However, when the amount of medicine pieces 5 exceeds the capacity of the rotary container, the internal space expansion member 800 is mounted (see the medicine feeder 100 on the back left side in FIG. 7A), and a prescribed number or a slightly larger number of medicine pieces 5 are input in a random manner into the rotary container (illustration of the medicine pieces 5 is the same as that in FIGS. 12 and 13 discussed already, and thus is omitted).

The adjustment for width regulation on the medicine transfer path by the regulating mechanism 700 (see FIG. 4) and the adjustment for width regulation on the medicine transfer path by the sorting mechanism 600 (see FIG. 5) are performed, either before or after the medicine pieces are input. The sample placement site 740 of the regulating mechanism 700, the manual adjustment mechanism 650 of the sorting mechanism 600, etc. are not hidden even when the internal space expansion member 800 is mounted (see FIG. 7). Thus, the adjustment can be performed when the internal space expansion member 800 is mounted in the same manner as when the internal space expansion member 800 is not mounted.

The adjustment for width regulation by the regulating mechanism 700 (see FIGS. 4A and 4B) is executed by placing the sample medicine piece 5*a* in the sample placement site 740, closing the small lid 741, and further tightening the setscrew 742 to reliably fix the sample medicine piece 5*a*. The set state of the sample medicine piece 5*a* can be conveniently visually checked, and the two regulating members 710 and 720 can be easily and adequately positioned by the urging force of the spring 730.

The adjustment for height regulation by the second sorting member 620 of the sorting mechanism 600 (see FIGS.

5A and 5C) can be performed easily and adequately by placing another sample medicine piece 5a on the lower limit setting mechanism 651 and lowering the manual adjustment mechanism 650 to sandwich the sample medicine piece 5a. While this adjustment is sufficient in most cases, the support member 621 may be slightly moved up and down with reference to the scale with the sample medicine piece 5a being removed when it is desired to make a fine adjustment based on trial operation or actual operation performed previously. In addition (see FIGS. 5A and 5B), the adjustment for height regulation by the first sorting member 610 of the sorting mechanism 600 can also be performed easily and adequately by making a manual adjustment with reference to the scale member 652 which indicates the size of the sample medicine piece 5a.

When the above preparations are all finished, the cover 110 is closed (see FIG. 7B) to prepare for consecutive discharge of medicine pieces. When the cover 110 is closed, the space above the top plate 11A and the rotary container (200, 300) is covered by the cover 110, and the upper end opening of the tubular portion 820 of the internal space expansion member 800 is substantially tightly closed to prevent falling of the medicine pieces 5. In addition, an initialization command is issued in response to an operation to open and close the cover 110 and a manual operation (see FIG. 8B), and the controller 570 clears an estimated value of the medicine size in response to the initialization command to advance preparations for discharge of medicine pieces. In order for the medicine feeder 100 to perform discharge operation, the condition that the inner inclined rotary body mount detecting section 550 is detecting the rotary shaft portion 370 of the inner inclined rotary body 300 must be met. Thus, the medicine pieces are consecutively discharged only in a safe state in which the rotary container (200, 300) is appropriately mounted (see FIG. 8A).

When a command to discharge medicine pieces is delivered to the controller 570 with the medicine feeder 100 being ready for consecutive discharge of medicine pieces, operation to discharge medicine pieces is controlled by the medicine discharge operation control program while the number-of-pieces management program is controlling the number of pieces. Initially, initial operation is performed since an estimated value of the medicine size has been cleared, and rotation of the rotary container (200, 300) is first started at high speed. The high speed is not so high as to cause damage such as breakage or a chip to the surface etc. of fragile medicine pieces 5. When a first medicine piece is moved from the inner inclined rotary body 300 to the outer rotary body 200, the rotational speed of the rotary container (200, 300) is reduced. Therefore, even if the first medicine piece 5 is fed onto the outer rotary body 200 early, an undesired event that easily rollable medicine pieces fall into the discharge port 14 is not caused.

During low-speed rotation, it is not expected that the medicine pieces 5 climb up the inclined inner surface of the outer rotary body 200 because of a centrifugal force generated at the peripheral edge portion of the inner inclined rotary body 300. However, since the delivery portions 340 with the downward slope 341 are formed at the peripheral edge portion of the inner inclined rotary body 300 (see FIG. 1), the medicine pieces 5 fall from the top of the upper surface portion 320 of the inner inclined rotary body 300 when the delivery portions 340 are lowered along with rotation of the inner inclined rotary body 300. Then, as the delivery portions 340 are raised along with further rotation of the inner inclined rotary body 300, the medicine pieces 5 at the delivery portions 340 are pushed up by the push-up portions 350 on the rear side.

The medicine pieces 5 may be carried onto the outer rotary body 200 by the inner inclined rotary body 300 through the above operation. Since the height of the push-up portion 350 is increased with the addition of the first projecting portion 361 of the projecting portion 360 in the delivery portion 340B provided with the projecting portion 360 and the inner peripheral side of the delivery portion 340B is also raised by the second projecting portion 362 of the projecting portion 360 as in the present embodiment, the medicine pieces 5 are pushed up from the inner inclined rotary body 300 to the outer rotary body 200 to be moved onto the annular upper end surface 230 even if rotation of the inner inclined rotary body 300 is extremely slow.

In the present embodiment, an urging section 321 composed of wavy uneven portions including a plurality of linear grooves is formed on the relatively flat upper surface portion 320 of the upper surface of the inner inclined rotary body 300. In this configuration, the direction of application of the friction force of the urging section 321 is varied under a condition that the relative direction of application of the gravity is varied by rotation of the inner inclined rotary body 300, thereby slowing down the inner inclined rotary body 300. The medicine pieces 5 placed on the upper surface portion 320 are effectively stirred, even if rotation of the inner inclined rotary body 300 is slow. Therefore, the tablets slide from the upper surface portion 320 to the delivery portions 340. Further, wavy uneven portions that are similar to those of the urging section 321 are also formed on the delivery portions 340A and 340B. Thus, many of the medicine pieces 5 at the delivery portions 340 that form clusters are quickly collapse when the medicine pieces 5 are pushed up by the push-up portions 350. As a result, there are a significantly reduced number of medicine pieces 5 stacked vertically when the medicine pieces 5 are moved from the inner inclined rotary body 300 to the annular upper end surface 230 of the outer rotary body 200.

Then, the medicine pieces 5 that have been moved onto the annular upper end surface 230 of the outer rotary body 200 (see FIG. 2A) are rolled. Especially, the easily rollable medicine pieces 5 reach the grooves 231 and then are stabilized at a location at which the groove width is large (see FIGS. 2B and 3). Even if the medicine pieces 5 are not easily rollable, the medicine pieces 5 are stabilized by light interference at the location of the grooves 231. Then the medicine pieces 5 are sequentially transferred (see FIG. 5A) by cyclic movement of the annular upper end surface 230 which forms the medicine transfer path. Specifically, the medicine pieces 5 go through a space under the front suspended objects 612 of the first sorting member 610 of the sorting mechanism 600, the inner peripheral side of the first regulating member 710 of the regulating mechanism 700, a space between the second regulating member 720 of the regulating mechanism 700 and the middle suspended objects 622 of the second sorting member 620 of the sorting mechanism 600, a space between the second regulating member 720 of the regulating mechanism 700 and the rear suspended objects 632 of the second sorting member 620 of the sorting mechanism 600, and the outer peripheral side of the discharge guide 13 and finally to the discharge port 14. During transfer, a component of the gravity acts to push back the medicine pieces 5, since the annular upper end surface 230 is inclined by the angle 3 in the direction of elevating the position of the discharge port 14 (see FIG. 2C). However, the component is significantly small, and smaller than the thrust due to the interference with the grooves 231, and therefore even easily rollable medicine pieces 5 are transferred without inconvenience.

The situation of transfer of medicine pieces will be discussed in detail, following the stages. First, when medicine pieces 5 come under the front suspended objects 612 of the sorting mechanism 600 (see FIGS. 5A and 5B), singular medicine pieces 5, whether flat or spherical, generally located at the center of the medicine transfer path on the annular upper end surface 230 are smoothly transferred without interfering with the front suspended objects 612. Medicine pieces 5 riding or leaning on other medicine pieces 5 interfere with the lower portion of the front suspended objects 612, and thus such riding is often resolved. Moreover, the medicine pieces 5 that have thus been interfered are often brought closer to a space between the two front suspended objects 612, that is, to the center of the medicine transfer path, or pushed toward the inner peripheral side with respect to the medicine transfer path and then are returned onto the inner inclined rotary body 300. The interference at that time is not likely to break the medicine pieces 5, even if the medicine pieces 5 are fragile, as the front suspended objects 612 are easily deformed to escape. In this manner, the height of the medicine pieces 5 is loosely regulated and, in some situations, the medicine pieces 5 are aligned in the lateral width direction at the front suspended objects 612.

Next, the medicine pieces 5 come to a side of the first regulating member 710 of the regulating mechanism 700 (see FIG. 5A). The lower level portion 711 is formed at the inner peripheral side surface portion of the first regulating member 710 (see FIG. 4C). The lower level portion 711 which assumes the lateral width regulation function pushes out two medicine pieces 5a, 5a arranged side by side on the inner peripheral side toward the inner inclined rotary body 300 from the top of the medicine transfer path. Or, the two medicine pieces are re-arranged in the front-rear direction on the medicine transfer path. In addition, the upper level portion 712 that assumes the height regulation function is also formed at the inner peripheral side surface portion of the first regulating member 710 (see FIG. 4C). The medicine pieces riding or leaning on other medicine pieces 5 interfere with the overhanging upper level portion 712 or an inclined surface provided therebelow, and thus stacking of two medicine pieces 5 is resolved. The stacking of two medicine pieces 5 has already been resolved to a certain degree by the first sorting member 610, and thus is substantially resolved by the first regulating member 710.

When the medicine pieces 5 come to the space between the second regulating member 720 of the regulating mechanism 700 and the middle suspended objects 622 of the sorting mechanism 600 (see FIG. 5A), the singular medicine pieces 5 slightly interfere with the middle suspended objects 622, but the medicine pieces are transferred without being hindered from progressing, since the interference between the middle suspended objects 622 and the medicine pieces is weak. On the contrary, medicine pieces 5 riding or leaning on other medicine pieces 5 interfere with the middle suspended objects 622 more strongly than the singular medicine pieces 5, and thus the stacking of the medicine pieces 5 is often resolved. The interference at this time is also not likely to break the medicine pieces 5, even if the medicine pieces 5 are fragile, as the middle suspended objects 612 are more easily deformed to escape than the front suspended object 612. Further, the medicine pieces 5 that have thus been interfered are pushed toward the inner peripheral side with respect to the medicine transfer path and then are returned onto the inner inclined rotary body 300, or brought closer to the second sorting member 620 to remain on the medicine transfer path.

When the medicine pieces 5 come to the space between the second regulating member 720 of the regulating mechanism 700 and the rear suspended objects 632 of the sorting mechanism 600 (see FIG. 5A), there are already almost no pair of medicine pieces 5 stacked vertically or arranged side by side, but there may be some medicine pieces 5 that remain on the medicine transfer path but that are so close to the inner peripheral side. Such medicine pieces 5 interfere with the rear suspended objects 632 to be brought closer to the second sorting member 620 while continuously remaining on the medicine transfer path. The interference between the rear suspended objects 632 and the medicine pieces is weak and gentle since the small balls 633 are small. With the assistance of the attracting force of the attracting member 640, swing of the rear suspended objects 632 is immediately suppressed by the attracting force of the attracting member 640 even when the rear suspended objects 632 are swung. As a result, the medicine pieces 5 are stably urged toward the second sorting member 620.

When the medicine pieces 5 come to a side of the rear end portion of the second regulating member 720 of the regulating mechanism 700 (see FIG. 5A), the final medicine piece alignment process is performed by the function for lateral width regulation by the lower level portion 721 and the function for height regulation by the upper level portion 722 similarly to when the medicine pieces come to a side of the first regulating member 710 as discussed above. At this time, the medicine pieces 5 are arranged in line on the medicine transfer path on the annular upper end surface 230.

In the medicine feeder 100, in this manner, the front suspended objects 612, the first regulating member 710, the middle suspended objects 622, the rear suspended objects 632, and the second regulating member 720 regulate the height and the lateral width of the medicine pieces, and thus the medicine pieces 5 on the annular upper end surface 230 of the outer rotary body 200 are arranged in line on the medicine transfer path by the height regulation and the lateral width regulation for the medicine pieces repeatedly performed many times, whether the medicine pieces 5 are sparse or dense.

Next, when the medicine pieces 5 come to the outer peripheral side of the discharge guide 13 (see FIG. 5A), the medicine pieces 5 are fed into the discharge port 14 along the outer peripheral side surface of the discharge guide 13 along with rotation of the outer rotary body 200. In that event, medicine pieces that are not easily rollable, such as those in a circular plate shape, are moved on the annular upper end surface 230 while being kept in a stable state by friction with the annular upper end surface 230, and thus fall into the discharge port 14 one by one. Medicine pieces that are easily rollable, such as those in a spherical shape, are pushed by the discharge guide 13 and thus are moved from the widened portions 231A of the grooves 231 on the annular upper end surface 230 to the inclined surface 232 of the annular upper end surface 230 via the distal end side of the grooves 231 (see FIGS. 2B and 3). The timing of movement of the easily rollable medicine pieces at this time from the grooves 231 to the inclined surface 232 is stabilized by the inclination (β) of the annular upper end surface 230 (see FIG. 2C). The subsequent movement of the medicine pieces toward the discharge port 14 is sped up and stabilized by the inclination (α−β) of the inclined surface 232. Thus, the easily rollable medicine pieces also fall into the discharge port 14 one by one.

Then, the medicine piece 5 that has fallen into the discharge port 14 falls down substantially in a free fall state through the falling path, and passes through the location to be detected by the falling medicine detecting section 560. When an estimated value of the medicine size has been cleared, that is, when the medicine piece 5 is the first medicine piece to be discharged, the medicine size is estimated according to the length of the time of the detected passage at that time. Further, the rotational speed of the rotary drive motor 540 and the rotational speed of the rotary container (200, 300) for the subsequent rotation are set based on the estimated value of the medicine size. Specifically, the speeds are automatically set such that the rotary container (200, 300) is rotated at high speed when the estimated value of the medicine size is large and the rotary container (200, 300) is rotated at low speed when the estimated value of the medicine size is small. After that, the rotary container (200, 300) is rotated at the set speed. Therefore, undesired falling of multiple medicine pieces is prevented by reducing the speed for small medicine pieces, and the efficiency is improved by increasing the speed for large medicine pieces.

Further, the medicine discharge operation control program notifies the number-of-pieces management program that one medicine piece has been discharged in the controller 570 each time falling of a medicine piece is detected by the falling medicine detecting section 560. Then, when it is confirmed by the number-of-pieces management program that the number of times of discharge of a medicine piece has reached a value indicated in the medicine discharge command, a command to stop discharge operation is output from the number-of-pieces management program to the medicine discharge operation control program. When this command is issued, operation of the rotary drive motor 540 is stopped under control by the medicine discharge operation control program, and thus medicine piece discharge operation is stopped. In this manner, a number of medicine pieces 5 are fed from the medicine feeder 100. Here, the number is indicated in the medicine discharge command, and supply of medicine pieces is performed according to the medicine discharge command and is completed speedily and adequately.

So far, description was omitted to avoid complication in the description of operation for a case where the internal space expansion member 800 is mounted to the medicine feeder 100 (see the one on the back left side in FIG. 7A) and medicine pieces 5 are input into the internal space expansion member 800 to a height exceeding the outer rotary body 200. Here, the operation will be additionally described in summary.

In this case, the medicine transfer path on the annular upper end surface 230 of the outer rotary body 200 and the space above the inner inclined rotary body 300 are separated by the suspended portion 830 of the internal space expansion member 800 (see FIG. 6A) from a position directly behind the location at which the medicine pieces 5 are moved from the inner inclined rotary body 300 to the outer rotary body 200 to a location before the discharge guide 13 (see FIG. 5A). Therefore, the medicine pieces 5 in the tubular portion 820 of the internal space expansion member 800 do not undesirably roll on, but the medicine pieces 5 are moved onto the medicine transfer path little by little through the swell 812 of the through hole 811 (see FIG. 6B).

Also when the internal space expansion member 800 is mounted to the medicine feeder 100, the medicine pieces 5 that have been returned from the medicine transfer path on the annular upper end surface 230 of the outer rotary body 200 onto the inner inclined rotary body 300 by the sorting mechanism 600 and the regulating mechanism 700 (see FIG. 5A) are accommodated in a gap between the inner peripheral wall surface of the outer rotary body 200 (see FIG. 2A) and the outer peripheral surface of the suspended portion 830 of the internal space expansion member 800 (see FIG. 6). Then the medicine pieces are returned to a space below the through hole 811 of the internal space expansion member 800 by the inner inclined rotary body 300. Since the delivery portions 340, the push-up portions 350, and further the projecting portions 360 are formed on the upper surface inclined portion 330 of the upper surface of the inner inclined rotary body 300. The medicine pieces 5 carried by the inner inclined rotary body 300 are adequately fed even in a situation in which the medicine pieces 5 are sunk below a large number of medicine pieces 5 in the internal space expansion member 800.

A method of control by the controller 570 will be described. The controller 570 allows selecting not only a discharge operation mode in which the outer rotary body 200 and the inner inclined rotary body 300 are simultaneously driven forward and in reverse, but also in a one-consecutive-reverse-rotation discharge operation mode in which one of the outer rotary body 200 and the inner inclined rotary body 300 is consecutively rotated in reverse. When the latter, one-consecutive-reverse-rotation discharge operation mode is selected, the inner inclined rotary body 300 alone is slightly rotated in reverse each time discharge of at least one medicine piece 5 is detected. Consequently, discharge of excessive medicine pieces can be adequately prevented, even for easily rollable medicine pieces 5, without reducing the speed of transfer through the medicine transfer path on the annular upper end surface 230 of the outer rotary body 200. A stirring effect which cannot be obtained through forward rotation alone can be exhibited through reverse rotation. In particular, the projecting portions 360 provided at the push-up portions 350 of the inner inclined rotary body 300 exhibit a large stirring effect also during reverse rotation. The proportion of reverse rotation to forward rotation is not limited to reverse rotation for each forward rotation as discussed above, and may be selected, as appropriate, as one reverse rotation per two forward rotations, one reverse rotation per several forward rotations, etc.

When medicine pieces still remain in the medicine feeder 100 when the medicine pieces to be handled by the medicine feeder 100 are to be changed, the remaining medicine pieces are to be collected. The medicine feeder 100 provides two methods of collecting the remaining medicine pieces. A first method is to continuously rotate the rotary container (200, 300) in reverse over a sufficient time. In this case, the medicine pieces on the outer rotary body 200 are pushed inward of the outer rotary body 200 by the sorting mechanism 600, the regulating mechanism 700, and the extended surface on the inner peripheral side of the discharge guide 13, etc. when the rotary container is rotated in reverse, and are collected on the inner inclined rotary body 300. The collected medicine pieces are manually, for example, taken out. A second method is to continuously rotate the rotary container (200, 300) forward until discharge is completed. In this case, discharged medicine pieces are collected by a collection container etc. when the feeder is used singly, and are collected and sealed in dispensing paper when the feeder is used as incorporated in a dispensing apparatus.

When the medicine pieces to be handled by the medicine feeder 100 are to be changed, the sample medicine pieces 5a are also to be changed. First, the sample medicine pieces 5a that have been set must be removed. It is not likely that the sample medicine piece 5a is undesirably left by mistake, since the small lid 741 for the sample placement site 740 of the regulating mechanism 700 is transparent and thus the presence or absence, shape, etc. of the sample medicine piece 5*a* placed in the sample placement site 740 can be visually seen easily and reliably. Likewise, the sample medicine piece 5*a* placed in the manual adjustment mechanism 650 of the sorting mechanism 600 is sandwiched and not sealed, and is visually seeable to a similar effect.

[Control for Discharge of Medicine Pieces]

Although some of the description is redundant with the earlier description, rotation control for the outer rotary body 200 performed by the controller 570 will be described below. Speed reduction control is performed before discharge of medicine for one packet is finished and reverse rotation control is performed after discharge of medicine for one packet is finished. When the medicine for one packet includes a plurality of medicine pieces, the outer rotary body 200 is initially rotated at an appropriate speed that allows medicine pieces to be aligned, and consecutive discharge of medicine pieces and detection of discharged medicine pieces are repeatedly quickly performed. When falling and discharge of a medicine piece immediately before completion of discharge (the second last medicine piece) are detected, rotation of the outer rotary body 200 is accordingly decelerated. This deceleration reduces the degree of "overrun that incurs discharge of excessive medicine pieces" compared to the case with no deceleration. Then, undesired discharge of excessive medicine pieces (falling of multiple tablets) is not likely to occur since the next medicine piece is kept away from the discharge port 14 by temporarily stopping rotation of the outer rotary body 200 quickly upon detecting falling and discharge of the (last) medicine piece that occur immediately after the falling and discharge of the second last medicine piece, or rotating the outer rotary body 200 in reverse (in the opposite direction) after rotation of the outer rotary body 200 is stopped.

When a large number of medicine pieces of the same kind are to be sealed in one packet based on a prescription, there is no inconvenience even if the medicine pieces are strung on the annular upper end surface 230 of the outer rotary body 200 or fed at high speed, provided that falling of medicine pieces is detected and medicine pieces are counted adequately for a first medicine piece to a medicine piece immediately before completion of discharge (the second last medicine piece), and an improvement in the precision in detecting falling and discharge of medicine pieces at the time of completion of discharge can be further expected because of deceleration in rotation of the outer rotary body 200 after detection of falling and discharge of a medicine piece immediately before completion of discharge. Moreover, uneven portions (234, 235) in a scattered point pattern between two adjacent grooves 231, 231 prevent and suppress undesired slide of medicine pieces that tends to occur during deceleration or reverse rotation of the annular upper end surface 230. Thus, discharge of medicine pieces can be sped up while avoiding discharge of excessive medicine pieces.

The time, since a medicine piece falls into the discharge port 14 from the outer edge of the upper surface (medicine transfer path) of the annular upper end surface 230 of the outer rotary body 200 that is rotating, until the medicine piece is detected to pass through the location to be detected by the falling medicine detecting section 560, is defined as a "time lag". The time, required to stop the outer rotary body 200 by decelerating rotation of the outer rotary body 200 without allowing the medicine pieces on the upper surface to slide, is defined as a "deceleration time". The number of medicine pieces of the same kind to be contained in one packet is defined as "N". Then, the "time lag", the "deceleration time", and the "N" meet the following relationship regarding the occurrence of the "overrun that incurs discharge of excessive medicine pieces" discussed above.

For first to (N−1)-th medicine pieces among N medicine pieces to be contained in one packet, the number of discharged medicine pieces is appropriately counted if the falling medicine detecting section 560 is normally functioning to detect medicine pieces. Thus, that is sufficient, and the magnitude of setting values etc. for the rotational speed of the outer rotary body 200, the time lag, and the deceleration time does not cause a problem of overrun. On the contrary, after detection of falling of an N-th medicine piece which is the last medicine piece for one packet, rotation of the outer rotary body 200 must be quickly decelerated and further stopped in order not to cause overrun in which medicine pieces for the next packet undesirably fall to be discharged.

Assuming a situation in which medicine pieces are closely continuous as if strung, it is necessary to suppress the allowable amount of rotation during deceleration of the outer rotary body 200 and the time lag so as to be small, and the rotational speed of the outer rotary body 200 is limited according to the time lag etc. in order to avoid the medicine pieces sliding on the annular upper end surface 230 to be uncontrollable. When undesired discharge of excessive medicine pieces is caused by overrun, dispensing operation is immediately stopped to remove the extra medicine pieces or, if dispensing operation should not be stopped, dispensation is performed again instead and an extra packet is removed later. Since either requires burdensome manual work that involves visual check etc., overrun must be avoided as much as possible.

Therefore, for the first to (N−1-th medicine pieces, operation is done quickly at an appropriate constant speed each time N medicine pieces for one packet are discharged. For a period of time, since discharge of the (N−1)-th medicine piece is detected until discharge of the last, N-th medicine piece is detected, the rotational speed of the outer rotary body 200 is reduced to 60% of the speed, for example, in consideration of an improvement in the function to prevent slide of the medicine pieces due to the uneven portions (234, 235) in a scattered point pattern discussed above. When deceleration is performed for only the last medicine piece for each packet so that the medicine piece is gently transferred in this manner, the occurrence of overrun is suppressed in a situation in which overrun is problematic, and medicine pieces to be contained in the next packet are not allowed to fall to be discharged but remain on the outer rotary body 200. Therefore, falling and discharge of medicine pieces for one packet can be adequately detected until the last medicine piece while suppressing a reduction in the efficiency due to deceleration to a minimum.

For reverse rotation of the outer rotary body 200 performed after discharge of the last, N-th medicine piece, among medicine pieces for one packet, is detected, the outer rotary body 200 is rotated in reverse by about 3°, for example. By rotating the outer rotary body 200 in the opposite direction in addition to deceleration in this manner, the leading medicine piece for the next packet brought close to the discharge port 14 is returned to a sufficiently safe area, and thus the function to prevent undesired overrun is further improved. More specifically, the rotational speed of the outer rotary body 200 has been reduced to about 60% immediately before opposite rotation (reverse rotation) of the outer rotary body 200 is performed upon detecting falling of the "last medicine piece for one packet", which suppresses the occurrence of overrun as discussed above. Thus, medicine pieces for the next packet can be immediately returned to a safe area sufficiently away from the discharge port 14 while avoiding undesired slide of the medicine pieces for the next packet during opposite rotation.

Then, in discharge of medicine pieces for the next packet, rotation of the outer rotary body 200 is reversed again so that the outer rotary body 200 is rotated in the direction of the original transfer. Therefore, the first one of the medicine pieces for the next packet is quickly fed into the discharge port 14 at the rotational speed of the outer rotary body 200, which is set as desired, from a "position in a safer area" that is reliably away from the discharge port 14. Although the first medicine piece for the next packet is in a safe area away from the discharge port 14, the amount of opposite rotation is suppressed to about 3°, and undesired slide of medicine pieces is prevented or suppressed by the uneven portions (234, 235) in a scattered point pattern between the grooves 231, 231 during acceleration after the opposite rotation, and therefore medicine pieces for the next packet are also discharged appropriately and quickly.

[Others]

While a sample medicine piece 5a selected from the medicine pieces 5 is placed in the manual adjustment mechanism 650 of the second sorting member 620 and the sample placement site 740 of the regulating mechanism 700 in the above embodiment, the sample medicine piece 5a is not limited to one selected from the medicine pieces 5, and may be a substitute with the same dimensions of the essential portion other than the medicine pieces.

While only the support member 621 of the second sorting member 620 is a straddling sorting member and the support member 611 of the first sorting member 610 is not a straddling sorting member in the sorting mechanism 600 in the above embodiment, this is not essential, and the support member 611 of the first sorting member 610 may also be a straddling sorting member.

While it has been described that the inner inclined rotary body 300 is slightly rotated in reverse in order to prevent excessive rolling of medicine pieces in some control or usage, the proportion of reverse rotation to forward rotation may be increased to be more. The projecting portions 360 are formed on the inner inclined rotary body 300 discussed above, and thus the inner inclined rotary body 300 can push up the medicine pieces 5 and deliver the medicine pieces 5 to the outer rotary body 200 even during reverse rotation. Thus, the medicine pieces 5 in the rotary container (200, 300) can be delivered while being reliably stirred, by alternately repeating forward rotation and reverse rotation at appropriate proportions.

While a photosensor incorporated in the journal portion for the rotary shaft portion 370 of the inner inclined rotary body 300 is described as an example of the inner inclined rotary body mount detecting section 550 in the above embodiment, the inner inclined rotary body mount detecting section 550 may be a different sensor capable of detecting the inner inclined rotary body 300 mounted in an appropriate attitude, and may be a mechanical switch, for example. The location at which the inner inclined rotary body mount detecting section 550 is mounted is also not limited to the inside of the journal portion for the rotary shaft portion 370. The mounting location may be a support plate etc. for the rotary drive motors 541 and 542, for example, or may be an intermediate position etc. between the rotary drive motors 541 and 542. The detection method is not limited to direct detection of the rotary shaft portion 370, and may be indirect detection performed via an appropriate link member etc.

While the rotary drive motors 541 and 542 are illustrated as being small compared to the rotary drive members 511 and 512 in FIG. 8A for the above embodiment, the rotary drive motors 541 and 542 may be larger, and the rotary drive members 511 and 512 may be smaller. While the rotary drive motor 541 and the rotary drive member 511 are not tilted and the rotary drive motor 542 and the rotary drive member 512 are tilted. It is arbitrary to determine which component is installed and whether it should be tilted. Further, the left or right position of the rotary drive motor 541 and the rotary drive member 511 and the left or right position of the rotary drive motor 542 and the rotary drive member 512 are design matters and can be determined as desired.

INDUSTRIAL APPLICABILITY

The medicine feeder according to the present invention may be used to replace some or all of a large number of medicine feeders of an aligned rotary type mounted on a tablet dispensing apparatus, may be mounted on a tablet splitting device on which only one or a small number of medicine feeders are mounted, and further may be mounted on a tablet counter (medicine piece counter) etc. operable to count up the number of medicine pieces consecutively fed in a device operable to charge medicine pieces such as tablets into a medicine bottle.

DESCRIPTION OF REFERENCE NUMERALS 5 medicine piece
5a sample medicine piece
5b randomly accommodated medicine piece
5c aligned medicine piece
10 medicine feeder
11 peripheral wall
12 transfer surface guide
13 discharge guide
14 discharge port
20 outer rotary body
21 body
22 internal space
23 annular upper end surface (medicine transfer path)
30 inner inclined rotary body
31 center projection
32 recessed portion
33 inclined portion
40 support mechanism
41 passive member
42 rotation transmission member
43 rotation transmission member
50 rotary drive mechanism
51 rotary drive member
54 rotary drive motor
60 sorting mechanism
61 base end portion
62 distal end portion (medicine piece abutment portion)
63 support portion
70 regulating mechanism
71 first regulating member
72 second regulating member
73 link mechanism
74 sample placement site
100 medicine feeder
110 cover
200 outer rotary body
201 plumb line
210 lower portion 220 internal space
230 annular upper end surface (medicine transfer path)
231 groove
232 inclined surface
233 recessed portion
300 inner inclined rotary body
310 body
320 upper surface portion
330 upper surface inclined portion
340 delivery portion
350 push-up portion
351 center portion extended surface
360 projecting portion
361 first projecting portion
362 second projecting portion
370 rotary shaft portion
500 rotary drive mechanism
511, 512 rotary drive member
541, 542 rotary drive motor
550 inner inclined rotary body mount detecting section
560 falling medicine detecting section
570 controller (control section)
610 first sorting member
611 support member
612 front suspended object
613 spherical body, large ball
620 second sorting member (straddling sorting member)
621 support member (straddling portion)
622 middle suspended object (laterally arranged suspended object)
623 medium ball
632 rear suspended object (laterally arranged suspended object)
633 small ball
640 attracting member
650 manual adjustment mechanism
651 lower limit setting mechanism
652 scale member
700 regulating mechanism
710 first regulating member
711 width regulating mechanism, lower level portion
712 height regulating mechanism, upper level portion
720 second regulating member
721 lower level portion
722 upper level portion
730 spring (urging member)
740 sample placement site
741 small lid (transparent member)
742 setscrew (fixing member)
800 internal space expansion member
810 flange portion
811 through hole
820 tubular portion
830 suspended portion

The invention claimed is:

1. A medicine feeder comprising:
an outer rotary body having therein an internal space that has an opening portion opening upward and an annular upper end surface that surrounds the opening portion, the outer rotary body being rotatable about a virtual vertical line that extends in an up-down direction within the internal space;
an inner inclined rotary body disposed in the internal space of the outer rotary body capable of rotating about a virtual inclined line, which is inclined with respect to the vertical line, with a plurality of solid medicine pieces being placed on an upper surface portion of the inner inclined rotary body, the inner inclined rotary body moving the plurality of medicine pieces onto the annular upper end surface of the outer rotary body when the inner inclined rotary body is rotated; and
a regulating mechanism operable to align the plurality of medicine pieces, which have been moved onto the annular upper end surface of the outer rotary body, along a rotational direction of the annular upper end surface when the outer rotary body is rotated, wherein:
a plurality of delivery portions and a plurality of push-up portions are formed in a peripheral edge region of the upper surface portion of the inner inclined rotary body and arranged alternately one by one in a circumferential direction, the plurality of delivery portions each having a downward slope that slopes downward toward an outer side even at an elevated position, and the plurality of push-up portions each having no downward slope;
when one or more of the medicine pieces are disposed on the downward slope at the elevated position, the plurality of delivery portions are each capable of letting the medicine pieces ride onto the annular upper end surface of the outer rotary body using the downward slope; and
the push-up portions are each capable of pushing up the one or more medicine pieces disposed on the delivery portion located in front of the push-up portion in a direction of forward rotation of the inner inclined rotary body to the elevated position.

2. The medicine feeder according to claim 1, wherein the elevated position is defined such that an end edge of each downward slope of the delivery portions of the inner inclined rotary body coincides with or is located above the annular upper end surface at the elevated position.

3. The medicine feeder according to claim 1, wherein:
an inclination angle of each downward slope is constant over the entire region of the delivery portions; and
the push-up portions each include a rising portion formed continuously with an end portion of the delivery portion located in a direction of reverse rotation of the inner inclined rotary body.

4. The medicine feeder according to claim 3, wherein the rising portion has a rising surface that is continuous with the downward slope and that extends in the same direction as a direction in which the virtual inclined line extends.

5. The medicine feeder according to claim 4, wherein:
the plurality of delivery portions are each composed of a first delivery portion and a second delivery portion arranged alternately in a circumferential direction of the peripheral edge region;
the first delivery portion is formed such that the upper surface portion and the downward slope of the inner inclined rotary body are continuous;
the inner inclined rotary body includes projecting portions each composed of a first projecting portion and a second projecting portion, the first projecting portion projecting from a first portion of the upper surface portion that is adjacent to the peripheral edge region, and the second projecting portion projecting from a second portion that is continuous with the first portion of the upper surface portion and that extends to an outer peripheral edge of the upper surface portion;
the second delivery portion is formed such that at least a part of the downward slope extends to an outer surface of the first projecting portion; and the rising surface of the rising portion extends to an outer surface of the second projecting portion.

6. The medicine feeder according to claim 1, wherein an urging section is provided on a portion of the upper surface portion of the inner inclined rotary body that is located inward with respect to the peripheral edge region, the urging section capable of generating a friction force in the circumferential direction of the inner inclined rotary body to urge the plurality of medicine pieces to be stirred on the upper surface portion and also to urge the medicine pieces to move rolling in a direction toward the first delivery portions.

7. The medicine feeder according to claim 6, wherein the urging section is composed of a plurality of wavy uneven portions arranged in the circumferential direction and extending toward the first delivery portions.

8. The medicine feeder according to claim 1, further comprising:
a falling medicine detecting section capable of detecting the falling medicine pieces discharged after being aligned on the upper surface portion of the outer rotary body; and
a controller configured to detect intervals of falling of the medicine pieces judging from an output of the falling medicine detecting section and to control rotation of at least one of the inner inclined rotary body and the outer rotary body according to the intervals, wherein
the controller has a function of individually reversing a rotational direction of the inner inclined rotary body and a rotational direction of the outer rotary body, and temporarily reverses rotation of the inner inclined rotary body according to falling of the medicine pieces detected by the falling medicine detecting section while rotating the outer rotary body forward.

9. The medicine feeder according to claim 1, further comprising
a discharge guide provided in rear of the regulating mechanism to guide the medicine pieces on the annular upper end surface of the outer rotary body from an inner peripheral side to an outer peripheral side of the annular upper end surface and to feed the medicine pieces into a discharge port for the falling medicine pieces, wherein:
the outer rotary body includes a plurality of grooves arranged at predetermined intervals in the circumferential direction on the annular upper end surface, the plurality of grooves each extending in a radial direction and including a widened portion with an increased width at an intermediate portion in the radial direction; and
the plurality of grooves are shaped to become narrower toward an inner peripheral edge and an outer peripheral edge of the annular upper end surface with respect to the widened portion.

10. The medicine feeder according to claim 9, wherein the plurality of grooves reach the inner peripheral edge.

11. The medicine feeder according to claim 9, wherein a bay-shaped recessed portion is formed in the annular upper end surface of the outer rotary body between two adjacent grooves, the recessed portion becoming deeper toward the inner peripheral edge to open radially inward at the inner peripheral edge.

12. The medicine feeder according to claim 8, wherein the controller performs control so as to reduce a rotational speed of the outer rotary body when the falling medicine detecting section detects falling and discharge of one medicine piece immediately before completion of discharge, and to temporarily stop or temporarily reverse rotation of the outer rotary body when the falling medicine detecting section detects completion of discharge of the last medicine piece.

13. The medicine feeder according to claim 9, wherein:
an annular inclined surface is formed at the outer peripheral edge of the annular upper end surface of the outer rotary body, the annular inclined surface sloping down toward a radially outer side over the entire circumference; and
the plurality of grooves extend into the annular inclined surface.

14. The medicine feeder according to claim 13, wherein:
the virtual vertical line which serves as a center of rotation of the outer rotary body is inclined by an angle β with respect to a plumb line, a direction of inclination of the virtual vertical line being determined so as to elevate a portion of the outer rotary body closer to the discharge port for the falling medicine pieces; and
the angle β is smaller than an inclination angle α of the inclined surface.

15. The medicine feeder according to claim 13, wherein a plurality of uneven portions in a scattered point pattern are formed between adjacent two of the grooves.

16. The medicine feeder according to claim 1, further comprising
a sorting mechanism operable to align the plurality of solid medicine pieces, which have been carried onto the annular upper end surface of the outer rotary body by means of rotation of the inner inclined rotary body, when the outer rotary body is rotated, wherein:
the sorting mechanism is configured to regulate a height of the plurality of medicine pieces on the annular upper end surface of the outer rotary body; and
the regulating mechanism is configured to regulate a position in a direction of a lateral width, as well as the height, of the plurality of medicine pieces on the annular upper end surface of the outer rotary body.

17. The medicine feeder according to claim 16, wherein:
the regulating mechanism reduces a width of a medicine transfer path on the annular upper end surface of the outer rotary body from an outer peripheral side; and
the regulating mechanism includes a height regulating portion that faces the annular upper end surface with a predetermined clearance and a width regulating portion that projects over the annular upper end surface to regulate the width of the medicine transfer path.

18. The medicine feeder according to claim 16, wherein:
the sorting mechanism includes one or more suspended objects suspended from above the annular upper end surface of the outer rotary body and deformable when a lower end portion of the one or more suspended objects is pushed sideways; and
the one or more suspended objects regulate the height of the medicine pieces on the annular upper end surface.

19. The medicine feeder according to claim 1, further comprising:
a housing that includes a peripheral wall that rotatably accommodates the outer rotary body therein; and
an internal space expansion member mounted on top of the peripheral wall of the housing to expand the internal space of the outer rotary body upward.

20. The medicine feeder according to claim 1, further comprising:
a falling medicine detecting section for detecting falling of the medicine pieces discharged after being aligned; and a controller configured to variably control a rotational speed of the outer rotary body according to detection by the falling medicine detecting section, wherein the controller has a function of estimating medicine sizes of the medicine pieces by detecting a time length of falling of one medicine piece judging from an output of the falling medicine detecting section, and a function of changing the rotational speed of the outer rotary body according to an estimated value of the medicine size.

21. The medicine feeder according to claim 20, wherein the controller is configured to change the rotational speed of the outer rotary body and a rotational speed of the inner inclined rotary body from high speed to low speed during initial operation before the estimated value is obtained.

22. The medicine feeder according to claim 20, further comprising a rotary drive mechanism operable to rotate the inner inclined rotary body and the outer rotary body, the rotary drive mechanism being capable of individually reversing a rotational direction of the inner inclined rotary body and a rotational direction of the outer rotary body according to a command from the controller, wherein the controller has a function of temporarily reversing rotation of the inner inclined rotary body when the outer rotary body is rotated forward and the falling medicine detecting section is detecting falling of the medicine pieces.

\* \* \* \* \*